(12) United States Patent
Mueller

(10) Patent No.: US 10,161,626 B2
(45) Date of Patent: *Dec. 25, 2018

(54) DUCTED FUEL INJECTION

(71) Applicant: National Technology & Engineering Solutions of Sandia, LLC, Albuquerque, NM (US)

(72) Inventor: Charles J. Mueller, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/363,966

(22) Filed: Nov. 29, 2016

(65) Prior Publication Data
US 2017/0114998 A1 Apr. 27, 2017

Related U.S. Application Data

(63) Continuation-in-part of application No. 14/789,782, filed on Jul. 1, 2015, now Pat. No. 9,909,549.
(Continued)

(51) Int. Cl.
*F23D 11/38* (2006.01)
*F02M 61/14* (2006.01)
(Continued)

(52) U.S. Cl.
CPC .............. *F23D 11/383* (2013.01); *F02B 1/06* (2013.01); *F02C 7/222* (2013.01); *F02M 57/00* (2013.01);
(Continued)

(58) Field of Classification Search
CPC ...... F23D 11/383; F23D 11/408; F23D 14/08; F02M 61/14; F02M 61/1806; F02M 57/00; F02D 11/408; F02B 1/06
(Continued)

(56) References Cited

U.S. PATENT DOCUMENTS 2,223,590 A 12/1940 Alden
2,295,081 A 9/1942 Harvath
(Continued)

FOREIGN PATENT DOCUMENTS

DE 894338 10/1953
FR 2880915 7/2006
(Continued)

*Primary Examiner* — David Hamaoui
*Assistant Examiner* — Kody Kight
(74) *Attorney, Agent, or Firm* — Medley, Behrens & Lewis, LLC

(57) ABSTRACT

Various technologies presented herein relate to enhancing mixing inside a combustion chamber to form one or more locally premixed mixtures comprising fuel and charge-gas to enable minimal, or no, generation of soot and/or other undesired emissions during ignition and subsequent combustion of the locally premixed mixtures. To enable sufficient mixing of the fuel and charge-gas, a jet of fuel can be directed to pass through a bore of a duct causing charge-gas to be drawn into the bore creating turbulence to mix the fuel and the drawn charge-gas. The duct can be located proximate to an opening in a tip of a fuel injector. The various technologies presented herein can be utilized in a number of combustion systems, such as compression-ignition (CI) reciprocating engines, spark-ignition (SI) reciprocating engines, gas-turbine (GT) engines, burners and boilers, wellhead/refinery flaring, etc.

20 Claims, 14 Drawing Sheets

Related U.S. Application Data

(60) Provisional application No. 62/278,184, filed on Jan. 13, 2016.

(51) Int. Cl.

| | | |
|---|---|---|
| *F02C 7/22* | (2006.01) | |
| *F23D 11/40* | (2006.01) | |
| *F23D 14/08* | (2006.01) | |
| *F02B 1/06* | (2006.01) | |
| *F02M 61/18* | (2006.01) | |
| *F02M 57/00* | (2006.01) | |

(52) U.S. Cl.
CPC ........ *F02M 61/14* (2013.01); *F02M 61/1806* (2013.01); *F23D 11/408* (2013.01); *F23D 14/08* (2013.01)

(58) Field of Classification Search
USPC .............................. 239/533.12; 123/298, 294
See application file for complete search history.

(56) References Cited

U.S. PATENT DOCUMENTS

| | | | |
|---|---|---|---|
| 2,821,177 A | 1/1958 | Allen | |
| 3,425,399 A | 2/1969 | Ward et al. | |
| 3,481,317 A | 12/1969 | Hughes | |
| 3,787,168 A | 1/1974 | Koppang et al. | |
| 3,844,707 A | 10/1974 | Wormser | |
| 4,020,801 A | 5/1977 | Jarnuszkiewicz | |
| 4,067,496 A | 1/1978 | Martin | |
| 4,245,589 A | 1/1981 | Ryan | |
| 4,345,555 A | 8/1982 | Oshima | |
| 4,369,746 A | 1/1983 | Thring | |
| 4,480,613 A | 11/1984 | Siewert | |
| 4,548,172 A * | 10/1985 | Bailey ...................... F02B 1/02 |
| | | | 123/297 |
| 4,974,559 A | 12/1990 | Nagaoka | |
| 5,095,872 A | 3/1992 | Kawamura | |
| 5,113,806 A | 5/1992 | Rodart | |
| 5,235,805 A | 8/1993 | Barbier et al. | |
| 5,294,056 A * | 3/1994 | Buchholz ............... F02M 67/02 |
| | | | 239/408 |
| 5,388,985 A | 2/1995 | Musil et al. | |
| 5,498,153 A | 3/1996 | Jones | |
| 5,573,396 A | 11/1996 | Swanson | |
| 6,168,422 B1 * | 1/2001 | Motyka ..................... F23G 5/32 |
| | | | 431/186 |
| 6,887,436 B1 | 5/2005 | Fisher | |
| 7,051,956 B2 | 5/2006 | Upatnieks | |
| 7,402,039 B1 | 7/2008 | McElroy | |
| 7,661,401 B2 | 2/2010 | Anezaki et al. | |
| 8,006,500 B1 * | 8/2011 | Wilson, III ............... F23R 3/38 |
| | | | 239/214.15 |
| 8,142,169 B2 | 3/2012 | Whaling et al. | |
| 8,272,218 B2 * | 9/2012 | Fox ........................... F02C 7/22 |
| | | | 239/500 |
| 8,864,491 B1 | 10/2014 | Pfefferie et al. | |
| 8,967,129 B2 | 3/2015 | Mueller | |
| 9,272,706 B2 | 3/2016 | Martin | |
| 9,400,104 B2 * | 7/2016 | Low ........................... F23R 3/28 |
| 2002/0041836 A1 | 4/2002 | Komai et al. | |
| 2004/0211389 A1 * | 10/2004 | DeLisle ................. F02B 19/14 |
| | | | 123/306 |
| 2005/0132650 A1 | 6/2005 | Fisher | |
| 2007/0042306 A1 | 2/2007 | Bacon | |
| 2008/0011887 A1 | 1/2008 | Parish | |
| 2008/0201063 A1 | 8/2008 | Reuss et al. | |
| 2009/0255998 A1 * | 10/2009 | Das ........................ F02M 61/162 |
| | | | 239/5 |
| 2011/0067671 A1 | 3/2011 | Laimboeck | |
| 2011/0253104 A1 | 10/2011 | Das | |
| 2012/0186555 A1 | 7/2012 | Mueller | |
| 2014/0075949 A1 | 3/2014 | Prociw | |
| 2015/0167981 A1 * | 6/2015 | Woods ................... F02M 61/14 |
| | | | 60/735 |
| 2015/0241065 A1 * | 8/2015 | Hughes ................... F23R 3/286 |
| | | | 60/737 |
| 2015/0275843 A1 | 10/2015 | McAlister | |
| 2016/0298531 A1 | 10/2016 | Anders et al. | |
| 2016/0298583 A1 | 10/2016 | Anders et al. | |

FOREIGN PATENT DOCUMENTS

| | | |
|---|---|---|
| JP | 1976042311 | 3/1976 |
| JP | 3286124 | 12/1991 |
| JP | 5086864 | 4/1993 |
| JP | 5272338 | 10/1993 |
| JP | 5296045 | 11/1993 |
| JP | 2002276373 | 9/2002 |
| JP | 2004038449 | 11/2004 |

\* cited by examiner

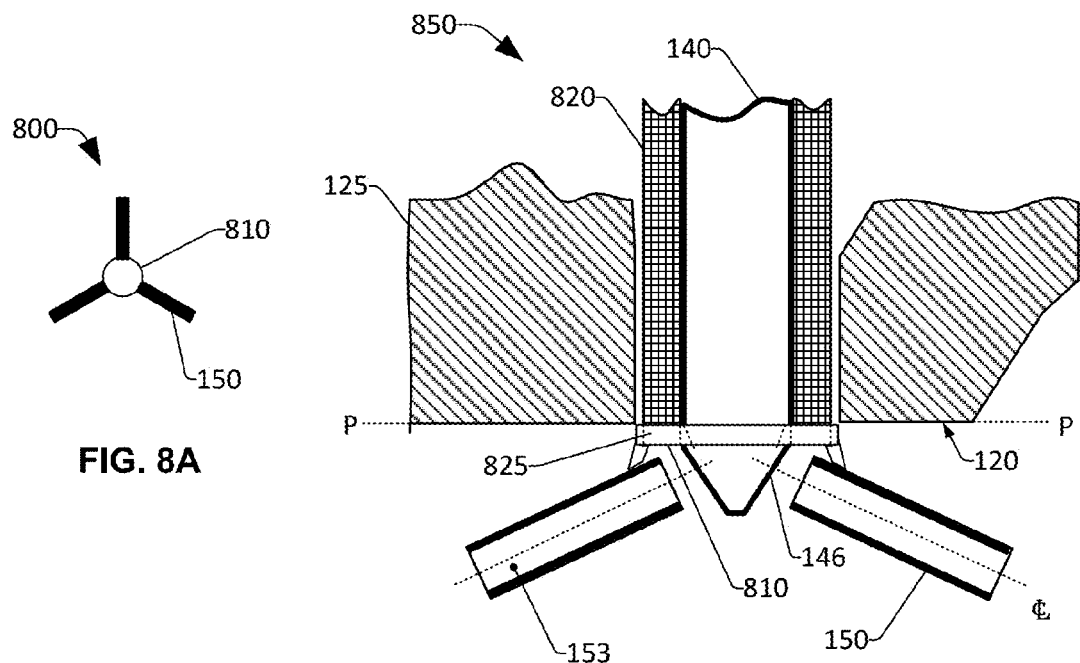
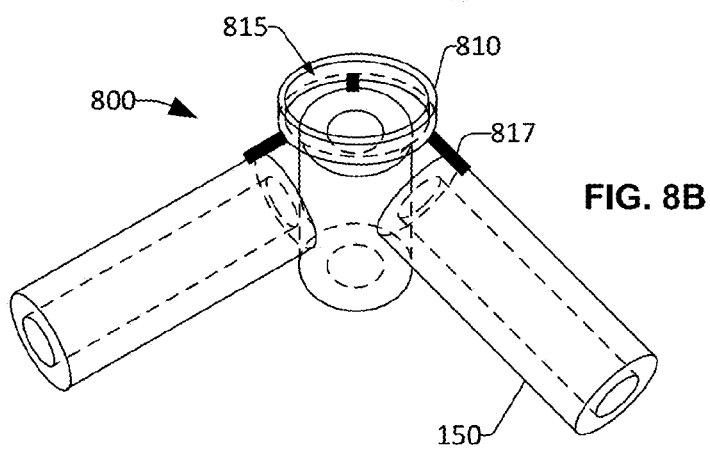
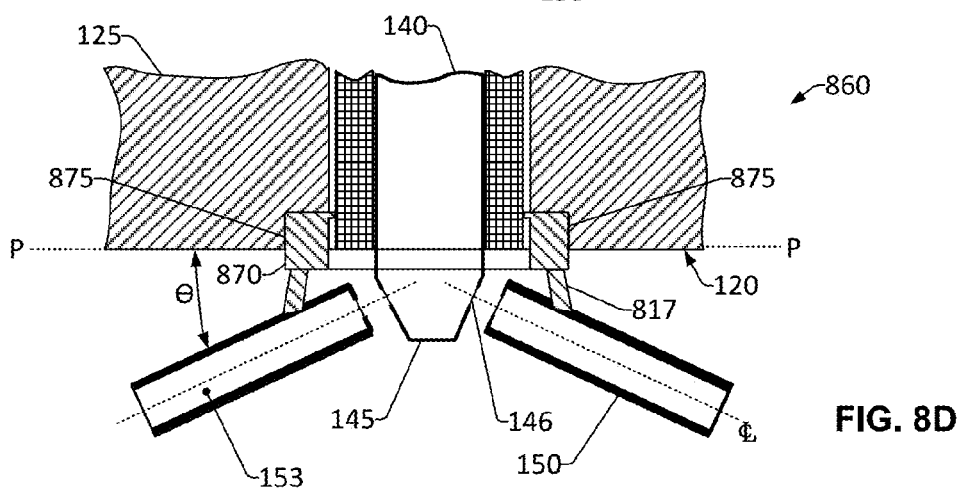

1000 ⇀

1010
LOCATE AND/OR ALIGN A DUCT PROXIMATE TO A FUEL JET OPENING, WHEREIN THE DUCT IS TUBULAR AND CAN INCLUDE AT LEAST ONE HOLE IN ITS SIDEWALL

1020
INJECT FUEL THROUGH THE OPENING SUCH THAT THE FUEL IS TRANSMITTED THROUGH AN INTERNAL BORE OF THE DUCT, THE FUEL MIXES WITH CHARGE-GAS DRAWN INTO THE DUCT

1030
IGNITE THE FUEL/CHARGE-GAS MIXTURE, WITH NEGLIGIBLE OR NO SOOT BEING FORMED

Locate an ignition assist component at a first end of a duct, wherein the duct is located and aligned proximate to a fuel jet opening, fuel is directed through the duct and a fuel/charge-gas mixture is emitted from the first end of the duct

2020

Control operation of the ignition assist component to facilitate ignition of the fuel/charge-gas mixture as the fuel/charge-gas mixture is emitted from the first end of the duct.

FIG. 20

DUCTED FUEL INJECTION

RELATED APPLICATIONS

This application claims priority to U.S. Provisional Patent Application No. 62/278,184, filed on Jan. 13, 2016, entitled "DUCTED FUEL INJECTION APPLICATIONS". This application is also a continuation in part of U.S. patent application Ser. No. 14/789,782, filed on Jul. 1, 2015, entitled "DUCTED FUEL INJECTION" and which claims priority to U.S. Provisional Patent Application No. 62/058,613, filed on Oct. 1, 2014, entitled "DUCTED FUEL INJECTION". The entireties of these applications are incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Many modern engines are designed such that each combustion cylinder of the engine includes a dedicated fuel injector configured to inject fuel directly into a combustion chamber. While such "direct injection" engines represent an improvement in engine technology over past designs (e.g., carburetors) with regard to increased engine efficiency and reduced emissions, direct injection engines can produce relatively high levels of certain undesired emissions.

Engine emissions can include soot, which results from combustion of a fuel-rich and oxygen-lean fuel mixture. Soot comprises small carbon particles created by the fuel-rich regions of diffusion flames commonly created in a combustion chamber of an engine which may be operating at medium to high load. Soot is an environmental hazard, an emission regulated by the Environmental Protection Agency (EPA) in the United States of America, and the second most important climate-forcing species (carbon dioxide being the most important). Currently, soot is removed from the exhaust of diesel engines by large and expensive particulate filters in the exhaust system. Other post-combustion treatments may also have to be utilized, such as $NO_x$ selective catalytic reduction, a $NO_x$ trap, oxidation catalyst, etc. These after-treatment systems have to be maintained to enable continued and effective reduction of soot/particulates and other undesired emissions, and accordingly add further cost to a combustion system both in terms of initial equipment cost and subsequent maintenance.

A focus of combustion technologies is burning fuel in leaner mixtures, because such mixtures tend to produce less soot, $NO_x$, and potentially other regulated emissions such as hydrocarbons (HC) and carbon monoxide (CO). One such combustion strategy is Leaner Lifted-Flame Combustion (LLFC). LLFC is a combustion strategy that does not produce soot because combustion occurs at equivalence ratios less than or equal to approximately two. The equivalence ratio is the actual ratio of fuel to oxidizer mass divided by the stoichiometric ratio of fuel to oxidizer mass. LLFC can be achieved by enhanced local mixing of fuel with the charge-gas (i.e., air with or without additional gas-phase compounds) in the combustion chamber.

SUMMARY

The following is a brief summary of subject matter that is described in greater detail herein. This summary is not intended to be limiting as to the scope of the claims.

Described herein are various technologies designed to enhance local mixing rates inside a combustion chamber, relative to mixing produced in a conventional combustion chamber configuration/arrangement. The enhanced mixing rates are used to form one or more locally premixed mixtures comprising fuel and charge-gas, such that the formed mixtures create minimal, or zero, soot and/or other undesirable emissions in the combustion chamber during the ignition and subsequent combustion of the locally premixed mixtures. To enable mixing of the fuel and the charge-gas to produce a locally premixed mixture with such an improved fuel to charge-gas ratio distribution, a jet of fuel can be directed such that it passes through a bore of a duct (e.g., down a tube, a hollow cylindroid), with passage of the fuel causing charge-gas to be drawn into the bore such that turbulence is created within the bore to cause enhanced mixing of the fuel and the drawn charge-gas. A charge-gas inside the combustion chamber can comprise air with or without additional gas-phase compounds.

Combustion of the locally premixed mixture(s) can occur within a combustion chamber, wherein the fuel can be any suitable flammable or combustible liquid or vapor. For example, the combustion chamber can be formed as a function of various surfaces comprising a wall of a cylinder bore (e.g., formed in an engine block), a flame deck surface of a cylinder head, and a piston crown of a piston that reciprocates within the cylinder bore. A fuel injector can be mounted in the cylinder head, wherein fuel is injected into the combustion chamber via at least one opening in a tip of the fuel injector. For each opening in the fuel injector tip, a duct can be aligned therewith to enable fuel injected by the fuel injector to pass through the bore of the duct. Charge-gas is drawn into the bore of the duct as a result of the low pressures locally created by the high velocity jet of fuel flowing through the bore. This charge-gas mixes rapidly with the fuel due to intense turbulence created by the large velocity gradients between the duct wall and the centerline of the fuel jet, resulting in the formation of a locally premixed mixture with a distribution of fuel to charge-gas ratios exiting the duct that forms minimal, or zero, soot and/or other undesirable emissions during subsequent ignition and combustion in the combustion chamber.

In an embodiment, the duct can have a number of holes or slots formed along its length to further enable charge-gas to be drawn into the bore of the duct during passage of the fuel along the bore.

In another embodiment, the duct can be formed from a tube wherein the walls of the tube are parallel to each other (e.g., a hollow cylinder), hence a diameter of the bore at the first end of the duct (e.g., an inlet) is the same as the diameter of the bore at the second end of the duct (e.g., an outlet). In another embodiment, the walls of the tube can be non-parallel such that the diameter of the bore at the first end of the duct is different from the diameter of the bore at the second end of the duct.

The duct(s) can be formed from any material suitable for application in a combustion chamber, e.g., a metallic-containing material such as steel, INCONEL, HASTELLOY, etc., a ceramic-containing material, etc.

In a further embodiment, the duct(s) can be attached to the fuel injector prior to insertion of the fuel injector into the combustion chamber, with an assembly comprising the fuel injector and the duct(s) being located to form a portion of the combustion chamber. In another embodiment, the fuel injector can be located in the combustion chamber and the duct(s) subsequently attached to the fuel injector or cylinder head.

During operation of the engine, a temperature inside the bore of the duct may be less than an ambient temperature inside the combustion chamber such that the ignition delay of the mixture is increased, and mixing of the fuel and charge-gas prior to autoignition is further improved compared with direct injection of the fuel into the combustion chamber.

The various embodiments presented herein can be utilized in a number of combustion systems, such as compression-ignition (CI) reciprocating engines, spark-ignition (SI) reciprocating engines, gas-turbine (GT) engines, burners and boilers, wellhead/refinery flaring, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 8A and 8B illustrate an exemplary arrangement comprising three ducts and a threaded attachment portion.

FIG. 8C is a schematic of a duct assembly attached to a fuel injector assembly.

FIG. 8D is a schematic of a duct assembly attached to a flame deck to facilitate location of the duct assembly with respect to a fuel injector assembly.

FIG. 10 is a flow diagram illustrating an exemplary methodology for creating a locally premixed mixture with a distribution of fuel to charge-gas ratios that forms minimal, or zero, soot and/or other undesirable emissions in a combustion chamber.

FIG. 20 is a flow diagram illustrating an exemplary methodology for igniting a fuel/charge-gas mixture with an ignition assist component.

DETAILED DESCRIPTION

Figure 2:
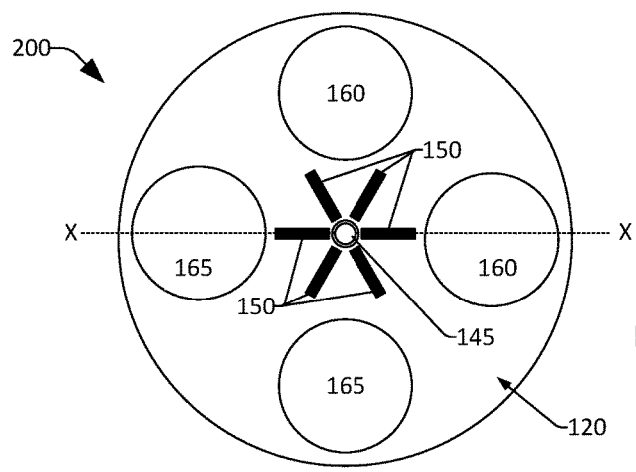
FIG. 2 is a schematic illustrating a flame deck, valves, fuel injector and ducts forming an exemplary combustion chamber apparatus.

Various technologies are presented herein pertaining to utilizing one or more ducts to create locally premixed fuel and charge-gas mixtures that form minimal, or zero, soot and/or other undesired emissions during combustion. Like reference numerals are used to refer to like elements of the technologies throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein can be utilized in a number of combustion systems, such as compression-ignition (CI) reciprocating engines, spark-ignition (SI) reciprocating engines, gas-turbine (GT) engines, burners and boilers, wellhead/refinery flaring, etc.

Figure 1:
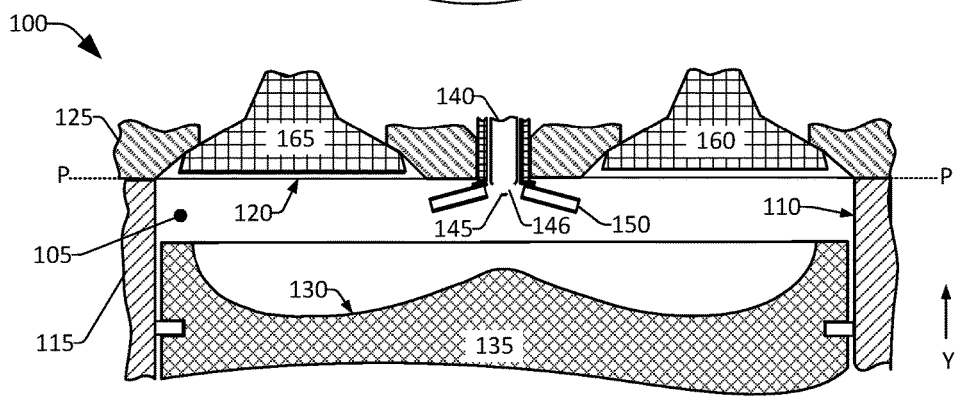
FIG. 1 is a sectional view of an exemplary combustion chamber apparatus.
Figure 3:
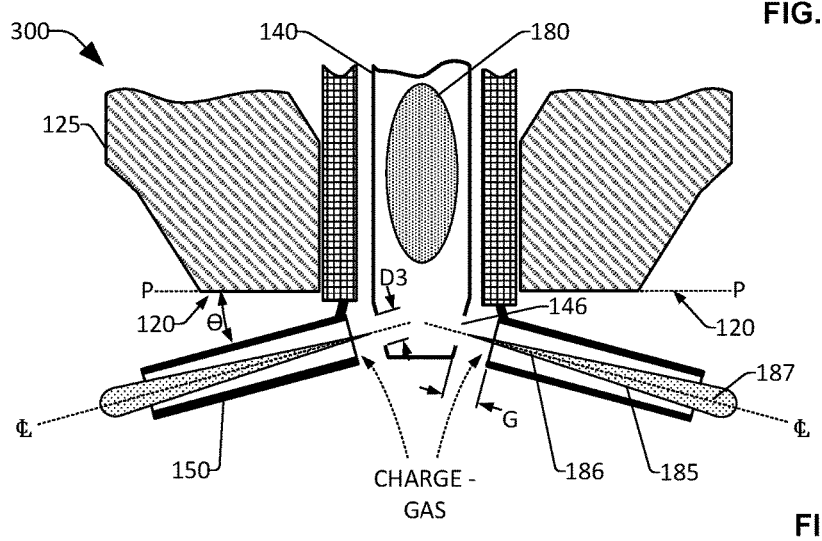
FIG. 3 is a close-up view of an exemplary combustion chamber apparatus comprising a fuel injector and an arrangement of ducts.

FIGS. 1, 2, and 3 illustrate an exemplary configuration(s) for a ducted fuel injection system. FIG. 1 is a sectional view through a combustion chamber assembly 100, wherein the sectional view is along X-X of FIG. 2. FIG. 2 illustrates configuration 200 which is a planar view of the combustion chamber assembly 100 in direction Y of FIG. 1. FIG. 3 presents configuration 300 which is an enlarged view of the fuel injection assembly illustrated in FIGS. 1 and 2.

FIGS. 1-3 collectively illustrate a plurality of common components which combine to form a combustion chamber 105. In an embodiment, the combustion chamber 105 has a generally cylindrical shape that is defined within a cylinder bore 110 formed (e.g., machined) within a crankcase or engine block 115 of an engine (not shown in its entirety). The combustion chamber 105 is further defined at one end (a first end) by a flame deck surface 120 of a cylinder head 125, and at another end (a second end) by a piston crown 130 of a piston 135 that can reciprocate within the bore 110. A fuel injector 140 is mounted in the cylinder head 125. The injector 140 has a tip 145 that protrudes into the combustion chamber 105 through the flame deck surface 120 such that it can directly inject fuel into the combustion chamber 105. The injector tip 145 can include a number of openings 146 (orifices) through which fuel is injected into the combustion chamber 105. Each opening 146 can be of a particular shape, e.g., a circular opening, and further, each opening 146 can have a particular opening diameter, D3.

Further, the combustion chamber 105 has located therein one or more ducts 150 which can be utilized to direct fuel injected in the combustion chamber 105 via an opening 146 of the injector 140 (as further described below). Per conventional operation of a combustion engine, an inlet valve(s) 160 is utilized to enable inlet of charge-gas into the combustion chamber 105, and an exhaust valve(s) 165 to enable exhausting of any combustion products (e.g., gases, soot, etc.) formed in the combustion chamber 105 as a function of a combustion process occurring therein. A charge-gas inside the combustion chamber 105 can comprise air with or without additional gas-phase compounds.

Figure 4:
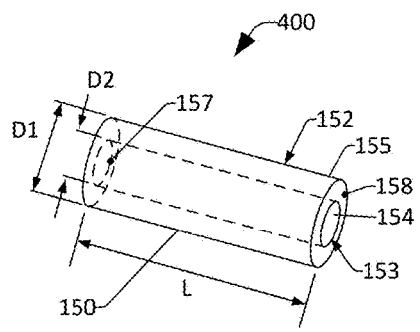
FIG. 4 is a schematic of a duct having a cylindrical configuration.

FIG. 2 illustrates the plurality of inlet valves 160 and the plurality of exhaust valves 165 which can be incorporated into the combustion chamber 105. Also, as shown in FIG. 2, one or more ducts 150 can be arranged around the tip 145, wherein, per FIG. 4, configuration 400, the duct 150 can be a tube or hollow cylindroid, comprising an external wall 152 having an external diameter of D1, and an internal bore 153 passing through the length of the duct 150, wherein the internal bore 153 has a diameter D2. As shown in FIG. 4, the duct 150 can be cylindrically formed such that an inner surface 154 of the external wall 152 and an outer surface 155 of the external wall 152 are parallel, and accordingly a first opening 157 at a first end of the duct 150 has the same diameter as a second opening 158 at a second end of the duct 150, e.g., the diameter of the first opening 157 (e.g., an inlet)=D2=the diameter of the second opening 158 (e.g., an outlet). The first end of the duct 150 can be located nearest to (proximal, adjacent to, abut) the opening 146, while the second end of the duct 150 is located distal to the opening 146 relative to the position of the first end of the duct 150. In an embodiment, as further described herein, the thickness of the external wall 152 can alter along the length of the duct 150, such that while the outer surface 155 of the external wall 152 is cylindrical, the inner surface 154 can be tapered and/or have a conical shape. In a further embodiment, the length L of the duct 150 can be of any desired length. For example, the duct 150 can have a length L of between about 30 to about 300 times the nominal diameter D3 of the opening 146, for example, about 30×D3 to about 300×D3.

Turning to FIG. 3, as previously mentioned, the tip 145 can include a plurality of openings 146 to enable passage of fuel 180 therethrough (e.g., fuel injection). From an initial volume of fuel 180 flowing through the injector 140, a plurality of jets of fuel 185 can be formed in accordance with the number and size of openings 146 located at the tip 145, as the initial fuel 180 passes through the respective openings 146. A direction of injection of the injected fuel 185 can be depicted per the centerline(s), $\mathcal{C}_L$, illustrated on FIG. 3. Hence, a duct 150 can be co-aligned (e.g., co-axially) with the centerline of the jet of fuel 185, such that the jet of fuel 185 exits from an opening 146 and passes through the bore 153 of the duct 150. Per FIGS. 3 and 4, a first (proximal) end 157 of the duct 150 can be positioned proximate to a respective opening 146, wherein the first end 157 can be positioned such that a gap, G, exists between the first end of the duct 150 and the opening 146. A second (distal) end 158 of the duct 150 can be located in the combustion chamber 105 such that the duct 150 extends from the tip 145 and into the combustion chamber 105.

As previously mentioned, in a situation where a fuel-rich mixture of fuel and charge-gas undergoes combustion, soot can be generated, which is undesirable. Hence, it is desired to have a fuel/charge-gas mixture having equivalence ratios less than or equal to approximately two. As the respective jet(s) of fuel 185 travels through the bore 153 of the respective duct 150, a pressure differential is generated inside of the duct 150 such that charge-gas in the combustion chamber 105 is also drawn into the duct 150. The charge-gas mixes rapidly with the fuel 185 due to intense turbulence created by the high velocity gradients between the duct bore 153 (at which the fluid velocity is zero) and the centerline of the fuel jet 185 (at which the fluid velocity is large). The turbulent conditions can enhance the rate of mixing between the jet of fuel 185 and the drawn charge-gas, wherein the degree of mixing of the fuel 185 and charge-gas in the bore 153 can be greater than a degree of mixing that would occur in a conventional configuration wherein the jet of fuel 185 was simply injected into the charge-gas filled combustion chamber 105 without passage through a duct. For the conventional configuration, the jet of fuel 185 would undergo a lesser amount of turbulent mixing with the charge-gas than is enabled by passing the jet of fuel 185 through the duct 150, per the configuration 100.

Per FIG. 3, at region 186 of the jet of fuel 185, the jet of fuel 185 comprises a high volume of fuel-rich mixture, while at the region 187 of the jet of fuel 185, the jet of fuel 185 has undergone mixing with the drawn-in charge-gas resulting in a locally more premixed mixture at region 187 compared to the fuel-rich mixture at region 186. Hence, per the configuration 100 presented in FIGS. 1-4, a high degree of mixing between the fuel 185 and the charge-gas in the duct 150 occurs, leading to a locally premixed fuel/charge-gas mixture with a distribution of fuel to charge-gas ratios, which, upon ignition and combustion of the mixture (e.g., from compression heating caused by motion of the piston 135), results in a lower quantity of soot and/or other undesirable emissions being generated than is achieved with a conventional arrangement. A "lean-enough" mixture at the region 187 can have an equivalence ratio(s) of between 0 and 2, while a "too-rich" mixture at the region 186 is a mixture having an equivalence ratio(s) greater than 2.

In an embodiment, the diameter D2 of the bore 153 of the duct 150 can be greater than the diameter D3 of the respective opening 146 to which the first end 157 of the duct 150 is proximate. For example D2 can be about 2 times larger than D3, D2 can be about 50 times larger than D3, D2 can have a diameter that is any magnitude greater than D3, e.g., a magnitude selected in the range of about 2 times larger than D3 through to a value of 50 times larger than D3, etc.

As shown in FIG. 3, the duct(s) 150 can be aligned relative to the flame deck surface 120, with an alignment of θ° between the duct 150 and the flame deck surface 120. θ can be of any desired value, ranging from 0° (e.g., the duct 150 is aligned parallel to a plane P-P formed by the flame deck surface 120) to any desired value, wherein alignment of the duct 150 can be aligned to the centerline of travel, $\mathcal{C}_t$, of the jet of fuel 185. In an embodiment, where the jet of fuel 185 exits a respective opening 146 of the fuel injector 140 in a direction aligned substantially parallel to the flame deck surface 120, plane P-P, the duct 150 can also be aligned substantially parallel to the plane P-P. A consideration for the alignment of the duct(s) 150 is prevention of interference with the reciprocating motion of the piston 135, the intake valves 160, and the exhaust valves 165, e.g., the duct(s) 150 should be aligned such that it does not come into contact with the piston crown 130, the intake valves 160, or the exhaust valves 165.

Figure 5A:
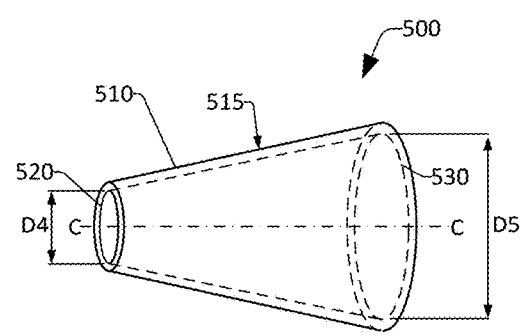
FIG. 5A is a schematic of a duct having non-parallel sides.
Figure 5B:
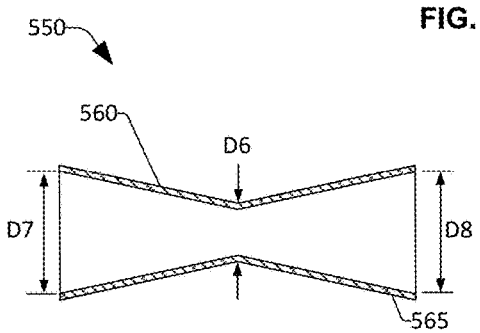
FIG. 5B is a schematic of a duct having an hourglass profile.
Figure 5C:
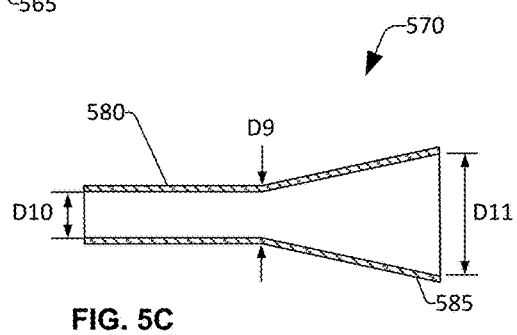
FIG. 5C is a schematic of a duct having a funnel-shaped profile.

While FIG. 4 illustrates the duct 150 as having a cylindrical form with the external surface 155 of the wall 152 being parallel to the internal surface 154 (e.g., bore 153 has a constant diameter D2 throughout), the duct 150 can be formed with any desired section. For example, in configuration 500, as illustrated in FIG. 5A, a duct 510 can be formed having an external wall 515 that is tapered such that a first opening 520 (e.g., an inlet) at a first end of the duct 500 has a diameter D4 which is different to a diameter D5 of a second opening 530 (e.g., an outlet) at a second end of the duct 510. The configuration 500 can be considered to be a hollow frustum of a right circular cone. In another configuration 550, as illustrated in FIG. 5B, a duct 560 can be formed having an external wall 565 with an "hourglass" profile, wherein a central portion can have a narrower diameter, D6, than diameters D7 (first opening) and D8 (second opening) of the respective first end and second end of the duct 560. It is to be appreciated that the diameter D7 of the first opening can have the same diameter as the diameter D8 of the second opening, or D7>D8, or D7<D8. In addition, while, for simplicity of illustration, the duct wall profiles shown in FIGS. 5A-C comprise straight lines, it is to be appreciated that these wall profiles can be produced from piecewise curved lines as well. In a further configuration 570, as illustrated in FIG. 5C, a duct 580 can be formed having an external wall 585 with a "funnel-shaped" profile, wherein a central portion having a diameter D9 is the same as a diameter D10 at a first opening of a first end of the duct 580, while diameter D9 is less than a diameter D11 of a second opening at a second end of the duct 580. Alternatively, the duct 580 can be turned around relative to the opening 146 such that the opening having diameter D11 can be located at the opening 146 such that passage of the fuel 185 is constricted before emerging from the opening having diameter D10. While not described herein, it is to be appreciated that other duct profiles can be utilized in accordance with one or more embodiments presented herein.

Figure 6A:
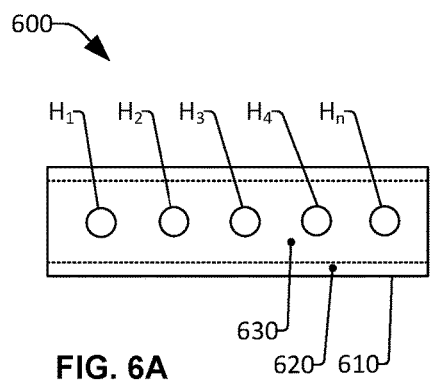
FIGS. 6A-6C illustrate a duct which includes a plurality of holes along its length.
Figure 6B:
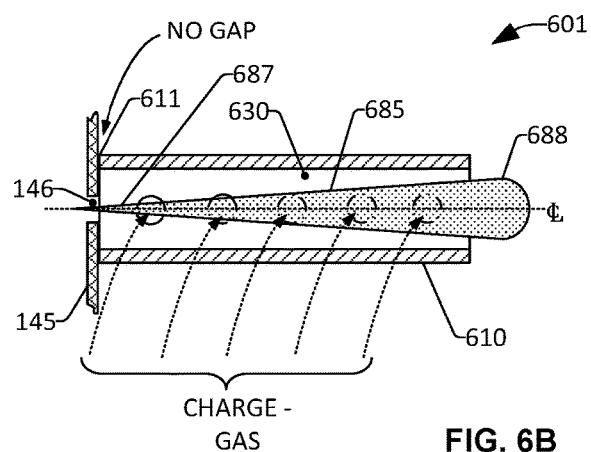
Figure 6C:
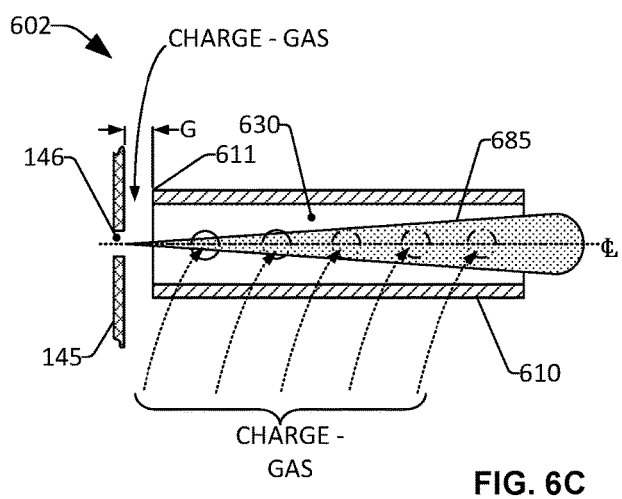

Further, as shown in FIGS. 6A-C, the tubular wall of a duct can have at least one hole(s) (perforation(s), aperture(s), opening(s), orifice(s), slot(s)) formed therein to enable ingress of charge-gas into the duct during passage of fuel through the duct. Per FIG. 6A, configuration 600, a duct 610 is illustrated, wherein the duct 610 has been fabricated with a plurality of holes, $H_1$-$H_n$, formed in a side of the duct 610 and extending through wall 620 and into internal bore 630, where n is a positive integer. It is to be appreciated that while FIG. 6A presents five holes $H_1$-$H_n$ formed into the wall 620 of the duct 610, any number of holes and respective placement can be utilized to enable drawing in charge-gas and subsequent mixing of the charge-gas with fuel passing through the duct 610. The holes $H_1$-$H_n$ can be formed with any suitable fabrication technology, e.g., conventional drilling, laser drilling, electrical discharge machining (EDM), etc.

FIG. 6B, configuration 601, is a sectional view of duct 610 illustrating a jet of fuel 685 being injected from opening 146, at injector tip 145, and through the bore 630 of the duct 610. The jet of fuel 685 initially comprises a fuel-rich region 687. However, as charge-gas is drawn into the bore 630, mixing of the fuel 685 and the charge-gas occurs (as previously described) such that region 688 comprises a locally premixed mixture with a distribution of fuel to charge-gas ratios where, during subsequent combustion, the "lean-enough" mixture undergoes combustion with minimal or no generation of soot and/or other undesirable emissions. As shown, for configuration 601, there is no separation (e.g., no gap, G) between a first end 611 of the duct 610 and the tip 145; the first end 611 of the duct 610 abuts the opening 146. For configuration 601, while ingress of charge-gas into the bore 630 is precluded by the lack of a gap between the first end 611 of the duct 610 and the tip 145, the incorporation of holes $H_1$-$H_n$ into the duct 610 enables charge-gas to be drawn through the holes $H_1$-$H_n$ into the bore 630 to enable formation of a locally premixed jet 685. While the duct 610 is illustrated as being perpendicularly aligned (e.g., parallel to $\mathcal{C}_t$) to the tip 145, the duct 610 can be positioned at any angle relative to the tip 145 (and the opening 146) to enable flow of the jet of fuel 685 through the duct 630.

FIG. 6C presents an alternative configuration 602, wherein a first end 611 of the duct 610 is located proximate to the tip 145 and the opening 146, with a gap G separating the first end 611 of the duct 610 from the tip 145. The gap G enables further charge-gas to be drawn into the duct 610 to supplement charge-gas being drawn into the bore 630 via the holes, $H_1$-$H_n$.

Figure 7A:
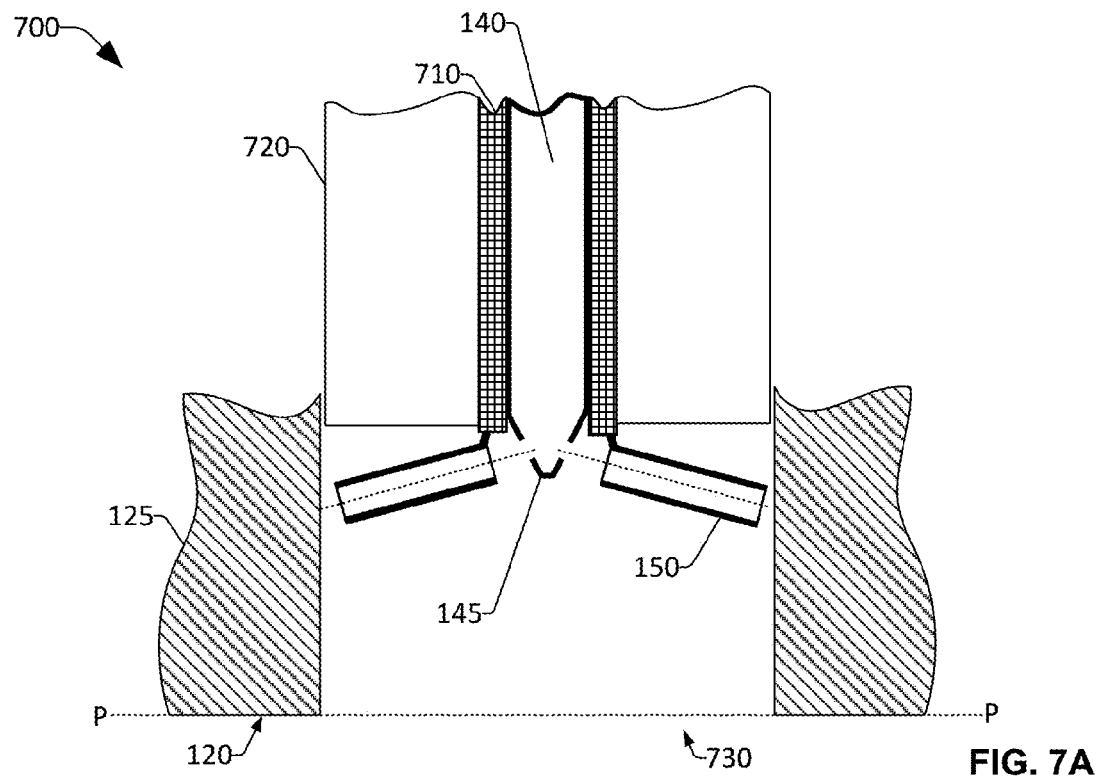
FIGS. 7A and 7B are schematics illustrating a fuel injector and duct assembly being located in a combustion chamber.
Figure 7B:
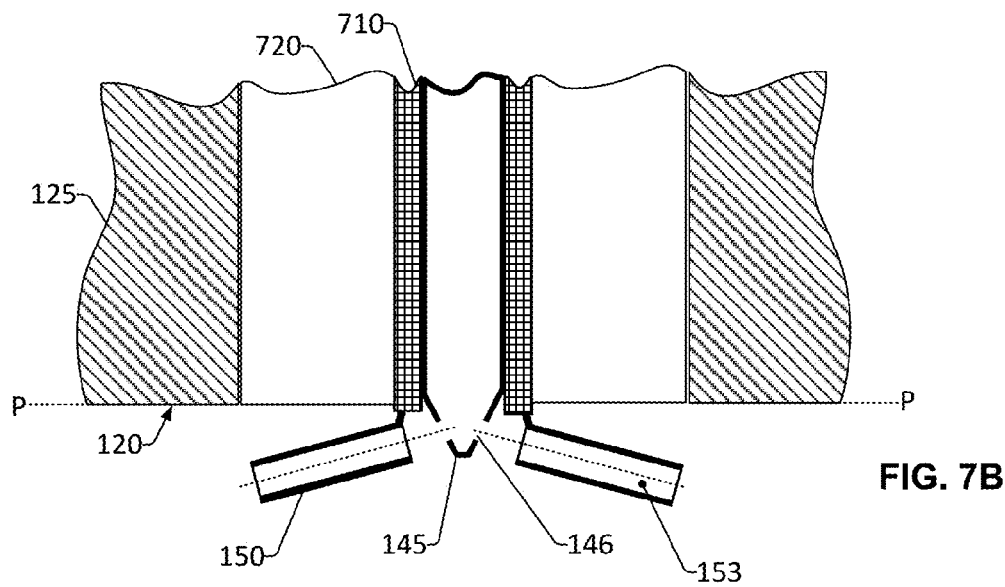

Per the various embodiments herein, a plurality of ducts can be located proximate to the injector tip 145, whereby the plurality of ducts can be attached to the injector tip 145, and the injector tip 145 and duct(s) assembly can be positioned in the cylinder head 125/flame deck surface 120 to form the combustion chamber. For example, per configuration 700 illustrated in FIGS. 7A and 7B, the duct(s) 150 can be attached to a sleeve 710 (shroud), or similar structure, which can be incorporated with the injector 140, into a support block 720. The cylinder head 125 can include an opening 730, wherein the support block 720, injector 140, sleeve 710 and duct(s) 150 are positioned relative to the flame deck surface 120 (e.g., plane P-P), per FIG. 7B, to enable location of the injector 140 and duct(s) 150 to form the combustion chamber 105, wherein the respective ducts 150 can be located with respect to the respective openings 146 of the injector 140 to enable passage of a jet of fuel (e.g., jet of fuel 185) through the bore 153.

In another embodiment, the injector tip can already be located at the flame deck and the duct(s) can be subsequently attached to the injector tip. As shown in FIGS. 8A and 8B, configuration 800, a locator ring 810 has a plurality of ducts 150 attached thereto. The locator ring 810 can include a means for attaching the locator ring 810; for example, an inner surface 815 of the locator ring 810 can be threaded, with the ducts 150 respectively attached by connectors 817. As shown in FIG. 8C, configuration 850, the locator ring 810 and ducts 150 can be assembled in combination with an injector 140. A sleeve 820, or similar structure, having the injector 140 incorporated therein, can further comprise an attachment means which compliments the attachment mechanism of the locator ring 810. For example, the sleeve 820 can include a threaded end 825 onto which the locator ring 810 can be threaded, wherein the respective ducts 150 can be located with respect to the respective openings 146 of the injector 140 to enable passage of a jet of fuel (e.g., jet of fuel 185) through the bore 153.

It is to be appreciated that the number of ducts 150 to be arranged around an injector tip 145 can be of any desired number, N (e.g., in accord with a number of openings 146 in a tip 145), where N is a positive integer. Hence, while FIG. 2 illustrates a configuration 200 comprising six ducts 150, FIGS. 8A and 8B illustrate a configuration 800 comprising three ducts 150, which are positioned relative to three openings 146 at the injector tip 145.

In a further embodiment, the duct(s) can be attached to the flame deck, either directly, or via a locator ring or other mechanism for attachment. As shown in FIG. 8D, configuration 860, a locator ring 870 has a plurality of ducts 150 attached thereto. The locator ring 870 can include a means for attaching the locator ring 870; for example, an outer surface of the locator ring 870 can be threaded, with the ducts 150 respectively attached by connectors 817. The threaded outer surface can be attached to a thread extending (e.g., at location 875) into the flame deck surface 120 to facilitate location of the respective ducts 150 relative to the respective openings 146 in the tip 145 of the injector 140. It is to be appreciated that other methods of attaching the ducts 150 to the flame deck can be utilized. In an example, the ducts 150 can be individually attached to the flame deck 120, e.g., by using screws. In another example, the locator ring 180 can be attached, e.g., by a weld, to the flame deck 120 at locations 875.

Figure 9A:
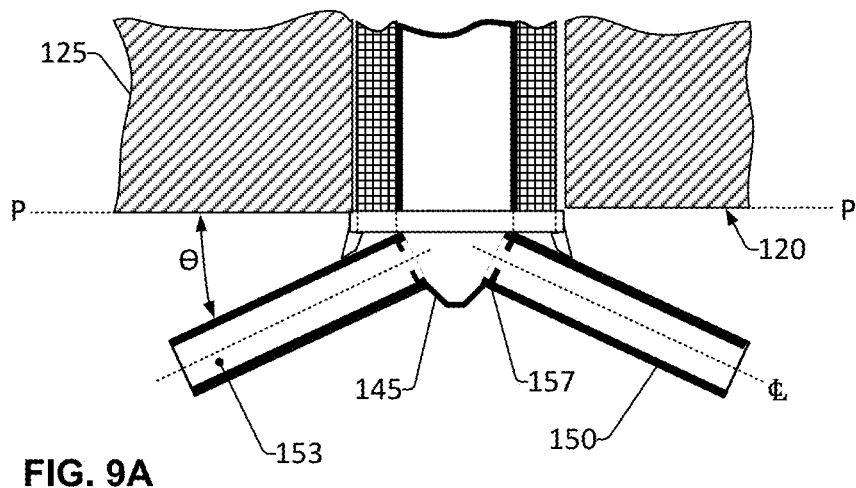
FIGS. 9A and 9B illustrate utilizing a duct to guide formation of an opening in a tip of a fuel injector.
Figure 9B:
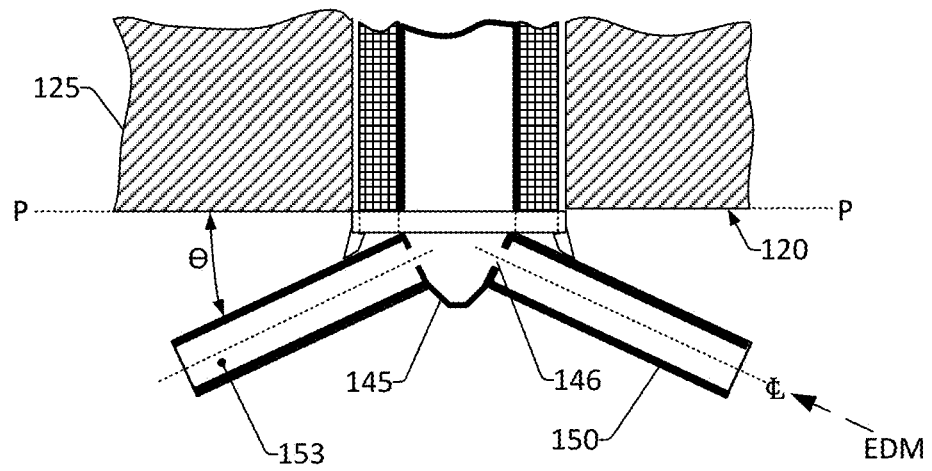

In an aspect, to maximize mixing of fuel and charge-gas in a duct bore it may be beneficial to have the direction of emission of the fuel from an opening in a fuel injector to be accurately co-aligned with the centerline of the bore. To achieve such accurate co-alignment, a bore can be utilized to aid formation of an opening. Such an approach is shown in FIGS. 9A and 9B. As illustrated in FIG. 9A, a duct 150 is positioned (e.g., as described with reference to FIGS. 7A, 7B, 8A, 8B, 8C) such that a first end 157 of the duct 150 abuts (e.g., there is no gap, G) an injector tip 145. The duct 150 is aligned at a desired angle θ° with reference to a plane P-P of a flame deck surface 120 and a desired centerline of travel, $\mathbb{C}_L$, along which a jet of fuel (e.g., fuel 185, 685) will travel.

With the duct 150 positioned as desired, an opening 146 can be formed at the tip 145. In an embodiment, the opening 146 can be formed by electrical discharge machining (EDM), however, it is to be appreciated that any suitable fabrication technology can be utilized to form the opening 146. As shown, the duct 150 can be utilized to enable the EDM operation to be performed at desired angle, e.g., the duct 150 can be utilized to guide a tool piece (e.g., an EDM electrode) at an angle to enable formation of the opening 146 having an alignment to enable the jet of fuel to flow in the direction of the centerline of travel, $\mathbb{C}_L$. It is to be appreciated that while FIGS. 9A and 9B show duct 150 abutting the injector tip 145, and further, having no openings along the length of the duct 150, other arrangements (e.g., any of the various configurations shown in FIGS. 1-8C) can be utilized. For example, the first end 157 of the duct 150 can be positioned proximate to the injector tip 145, e.g., with a gap G therebetween. In a further example, the duct 150 can include one or more holes along its length (e.g., holes $H_1$-$H_n$). In another example, the duct(s) 150 can be attached proximate to the injector tip 145 per either of configurations 700 or 850.

The duct(s) 150 can be formed from any material suitable for application in a combustion chamber, e.g., a metallic-containing material such as steel, INCONEL, HASTELLOY, etc., a ceramic-containing material, etc.

It is to be appreciated that the various embodiments presented herein are applicable to any type of fuel and an oxidizer (e.g., oxygen), where such fuels can include diesel, jet fuel, gasoline, crude or refined petroleum, petroleum distillates, hydrocarbons (e.g., normal, branched, or cyclic alkanes, aromatics), oxygenates (e.g., alcohols, esters, ethers, ketones), compressed natural gas, liquefied petroleum gas, biofuel, biodiesel, bioethanol, synthetic fuel, hydrogen, ammonia, etc., or mixtures thereof.

Further, the various embodiments presented herein have been described with reference to a compression-ignition engine (e.g., a diesel engine), however, the embodiments are applicable to any combustion technology such as a direct injection engine, other compression-ignition engines, a spark ignition engine, a gas turbine engine, an industrial boiler, any combustion driven system, etc.

Furthermore, as well as reducing generation of soot, the various embodiments presented herein can also lower the emissions of other undesired combustion products. For example, if a locally premixed mixture with the correct distribution of fuel to charge-gas ratios is prepared at or downstream of the exit of the bore of a duct (e.g., bore 153 of duct 150) during combustion, emissions of nitric oxide (NO), other compounds comprising nitrogen and oxygen, unburned hydrocarbons (HC), and/or carbon monoxide (CO).

FIGS. 10-13 and 20 illustrate exemplary methodologies relating to forming a locally premixed mixture with a distribution of fuel to charge-gas ratios to minimize generation of soot and/or other undesirable emissions formed during combustion. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 10 illustrates a methodology 1000 for increasing mixing of a fuel prior to combustion. At 1010, a duct is located and/or aligned proximate to an orifice in a tip of a fuel injector. The duct can be a hollow tube, with an internal bore formed by an external wall. As previously described, by directing fuel through the internal bore of the duct, charge-gas is drawn into the duct with turbulent mixing occurring to cause generation of a locally premixed mixture exiting the duct that forms minimal or no soot and/or other undesired emissions during combustion. As further mentioned above, a number of holes can be formed in the external wall to facilitate drawing in further charge-gas from the combustion chamber to facilitate formation of a locally premixed mixture with an improved distribution of fuel to charge-gas ratios.

At 1020, fuel can be injected by the fuel injector, with the fuel passing through the orifice and into the bore of the duct. Passage of the fuel through the duct causes the fuel to mix with charge-gas drawn into the bore to enable the level of mixing to form the desired locally premixed mixture with an improved distribution of fuel to charge-gas ratios.

At 1030, the locally premixed mixture with an improved distribution of fuel to charge-gas ratios exiting the duct can undergo ignition as a function of operation of the combustion engine. Ignition of the locally premixed mixture results in negligible or no soot being formed, as compared with the larger quantities of undesirable emissions being formed from combustion of a "too-rich" mixture utilized in a conventional combustion engine or device.

Figure 11:
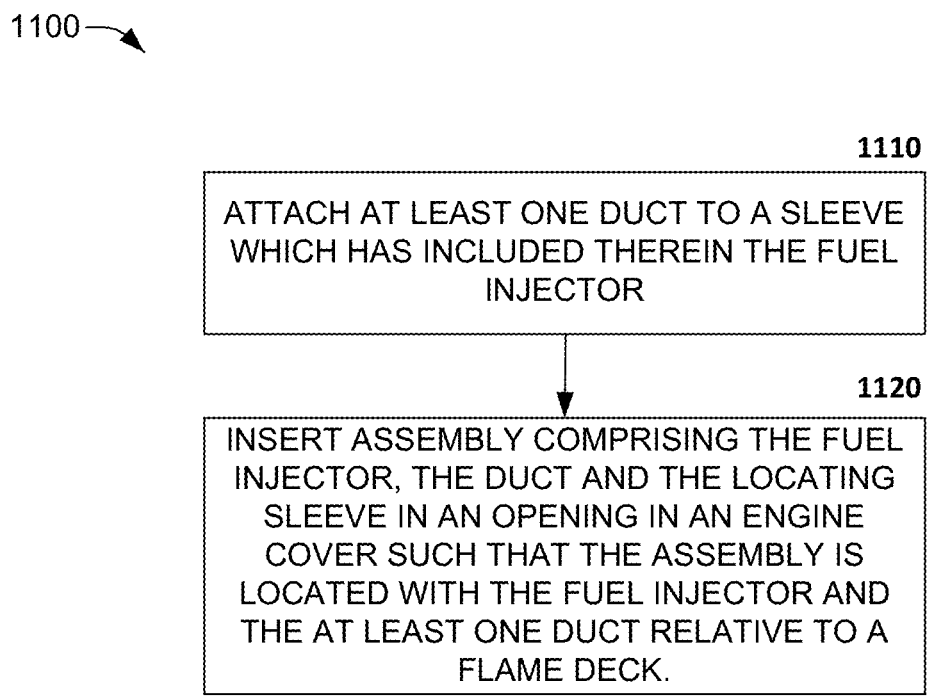
FIG. 11 is a flow diagram illustrating an exemplary methodology for locating an assembly comprising a fuel injector and at least one duct in a combustion chamber.

FIG. 11 illustrates a methodology 1100 for locating at least one duct at a fuel injector for incorporation into a combustion chamber. At 1110, at least one duct can be located proximate to an opening at a tip of a fuel injector. In an embodiment, the fuel injector can be placed in a sleeve to form an assembly such that a tip of a fuel injector protrudes from a first end of the sleeve. The at least one duct can be attached to the first end of the sleeve such that the at least one duct is aligned so that when a jet of fuel passes through a respective opening in the fuel injector, the jet of fuel passes through a bore in the duct. The at least one duct can be attached to the end of the first sleeve by any suitable technique, e.g., welding, mechanical attachment, etc.

At 1120, the assembly comprising the fuel injector, sleeve, and at least one duct can be placed in an opening in the cylinder head to enable the tip of the fuel injector and the at least one duct to be positioned, as desired, in relation to a plane P-P of a flame deck surface of a cylinder head, which further forms a portion of a combustion chamber.

Figure 12:
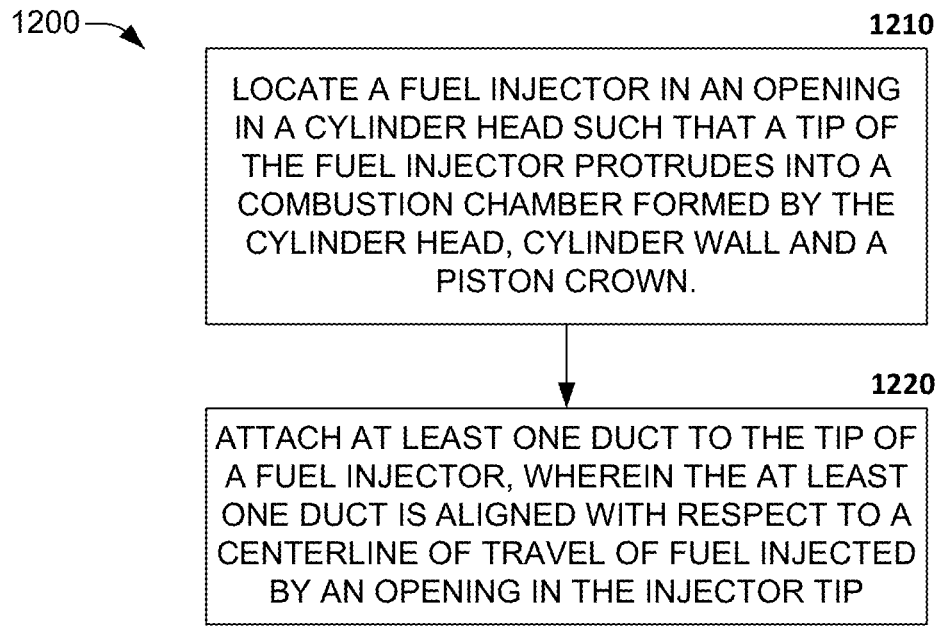
FIG. 12 is a flow diagram illustrating an exemplary methodology for locating at least one duct at a fuel injector in a combustion chamber.

FIG. 12 illustrates a methodology 1200 for locating at least one duct on a fuel injector incorporated into a combustion chamber. At 1210, a fuel injector can be placed in an opening in a cylinder head to enable a tip of the fuel injector to be positioned, as desired, in relation to a plane P-P of a flame deck surface of the cylinder head. The cylinder head, in combination with a piston crown and a wall of a cylinder bore, forms a combustion chamber.

At 1220, at least one duct can be attached to, or proximate to, the tip of the fuel injector such that the at least one duct can be located and/or aligned with respect to a direction of travel of fuel injected from each opening in the tip of the fuel injector with respect to each aligned duct.

Figure 13:
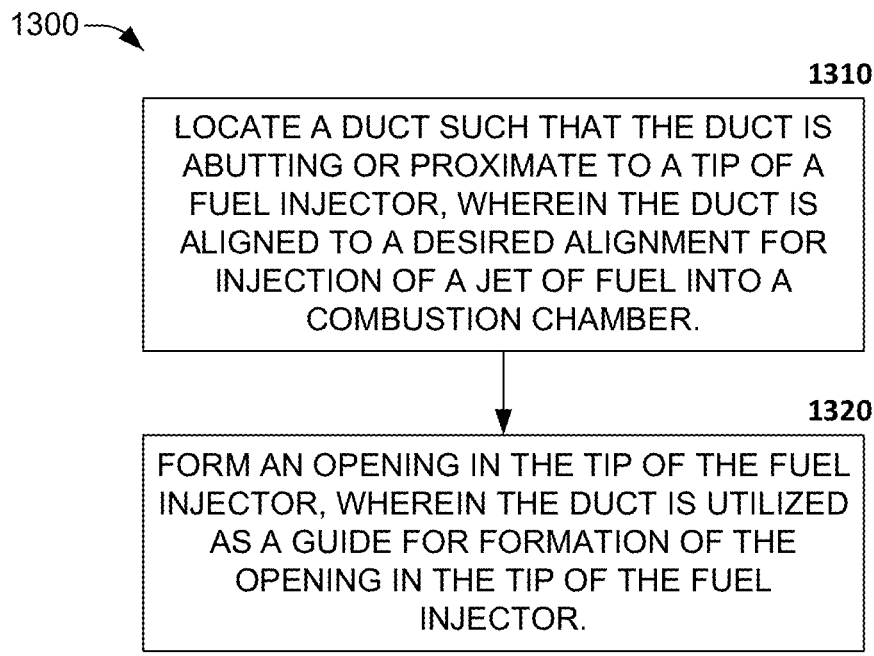
FIG. 13 is a flow diagram illustrating an exemplary methodology for utilizing a duct to guide formation of an opening in a tip.

FIG. 13 illustrates a methodology 1300 for utilizing a duct to guide formation of an opening in a tip of a fuel injector. At 1310, a duct is located at a tip of a fuel injector, wherein the duct can be positioned to abut the tip, or positioned with a gap G between a first (proximate) end of the duct. The duct can be aligned in accordance with a direction for which fuel is to be ejected from the fuel injector into a combustion chamber, e.g., the duct is aligned at an angle of θ° with reference to a plane P-P of a flame deck surface of the combustion chamber.

At 1320, an opening can be formed in the tip of the fuel injector. As previously described, the duct can be utilized to guide formation of the opening. For example, if the opening is to be formed by EDM, the bore of the duct can be utilized to guide an EDM electrode to a point on the tip of the fuel injector at which the opening is to be formed. Formation of the opening can subsequently occur per standard EDM procedure(s). Accordingly, the opening is formed at a desired location, e.g., centrally placed relative to the center of a circle forming a profile of the bore of the duct. Also, the walls of the opening can be aligned, e.g., parallel to the centerline ₵, to enable the jet of fuel being injected along the bore of the duct to be located centrally within the bore to maximize mixing between the fuel and the charge-gas drawn in from the combustion chamber.

Experiments were conducted relating to measurement of soot incandescence, which is indicative of whether LLFC was achieved when ducts were employed to inject fuel into a combustion chamber. In the experiments, LLFC was achieved, e.g., chemical reactions that did not form soot were sustained throughout the combustion event. OH* chemiluminescence was utilized to measure a lift-off length of a flame (e.g., axial distance between a fuel injector opening (orifice) and an autoignition zone). OH* is created when high-temperature chemical reactions are occurring inside an engine, and its most upstream location indicates the axial distance from the injector to where the fuel starts to burn, e.g., the lift-off length.

Conditions during the experiments are presented in Table 1.

TABLE 1

Operating conditions of a combustion chamber

| Ambient Temp. | Ambient Pressure | Ambient Gas Density | Ambient Oxygen Mole Fract. | Tip Opening Diameter | Fuel Injection Pressure | Fuel |
|---|---|---|---|---|---|---|
| 950 K | 6.0 MPa | 22.8 kg/m³ | 21% | 0.090 mm | 150 MPa | n-dodecane |

A baseline freely propagating jet ("free-jet") flame exhibiting high soot incandescence signal saturation was observed, indicating that a significant amount of soot was produced without a duct in position. Next, the combustion of ducted jets was studied. A plurality of duct diameters and duct lengths were tested, including duct inside diameters of about 3 mm, about 5 mm, and about 7 mm, and duct lengths of about 7 mm, about 14 mm, and about 21 mm.

Such a ducted jet experiment was subsequently conducted, using identical imaging conditions and similar operating conditions as those referenced above for the free jet, where a 3 mm inside diameter×14 mm long untapered steel duct was positioned about 2 mm downstream (e.g., gap G=about 2 mm) from the injector. The soot incandescence signal exhibited almost no saturation, which indicates that minimal, if any, soot was produced. The post-duct flame did not spread out as wide as the free-jet flame in the baseline experiment, as it moved axially across the combustion chamber. The combustion flame centered about the centerline, ₵, resulted from a combination of the mixing caused by the duct (as previously described) and further, as a function of heat transfer to the duct. The duct was operating at a temperature lower than the ambient conditions in the combustion chamber (e.g., 950 K), and accordingly, the duct allowed the injected fuel to travel in a lower temperature environment (e.g., within the bore of the duct) than would be experienced in a free jet flame.

A degree of turbulence generated during flow of the fuel through the duct was computed by determining a Reynolds number (Re) for conditions within the bore of the duct. Per Eqn. 1:

$$Re = \frac{\rho V L}{\mu}. \quad \text{Eqn. 1}$$

where ρ is the ambient density, V is velocity, L is the duct diameter, and μ is the dynamic viscosity. The velocity V was calculated per Eqn. 2:

$$V = \sqrt{\frac{2(p_{inj} - p_{amb})}{\rho_f}} \qquad \text{Eqn. 2}$$

where $p_{inj}$ is the fuel-injection pressure, $p_{amb}$ is the ambient pressure, and $\rho_f$ is the density of the fuel. Application of the operating conditions to Eqns. 1 and 2, generated Reynolds numbers of at least $1 \times 10^4$, indicating that turbulent conditions exist within the duct.

As previously mentioned, turbulent flow of a jet of fuel 185 through a duct 150 causes the jet of fuel 185 to mix with charge-gas that was drawn in from the outside of the duct 150 (e.g., through a gap G, and/or holes $H_1$-$H_n$), e.g., as a result of low local pressures in the vicinity of the duct entrance that are established by the high velocity of the injected jet of fuel 185. The turbulent mixing rate established within the duct 150 can be considered to be a function of the velocity gradients within the duct, which will be roughly proportional to the centerline fluid velocity at a given axial position divided by the duct diameter at the given axial position.

The various embodiments presented herein can be utilized in a number of combustion device applications, wherein the combustion devices can include compression-ignition (CI) reciprocating engines, spark-ignition (SI) reciprocating engines, gas-turbine (GT) engines, burners and boilers, wellhead/refinery flaring, etc.

Figure 14:
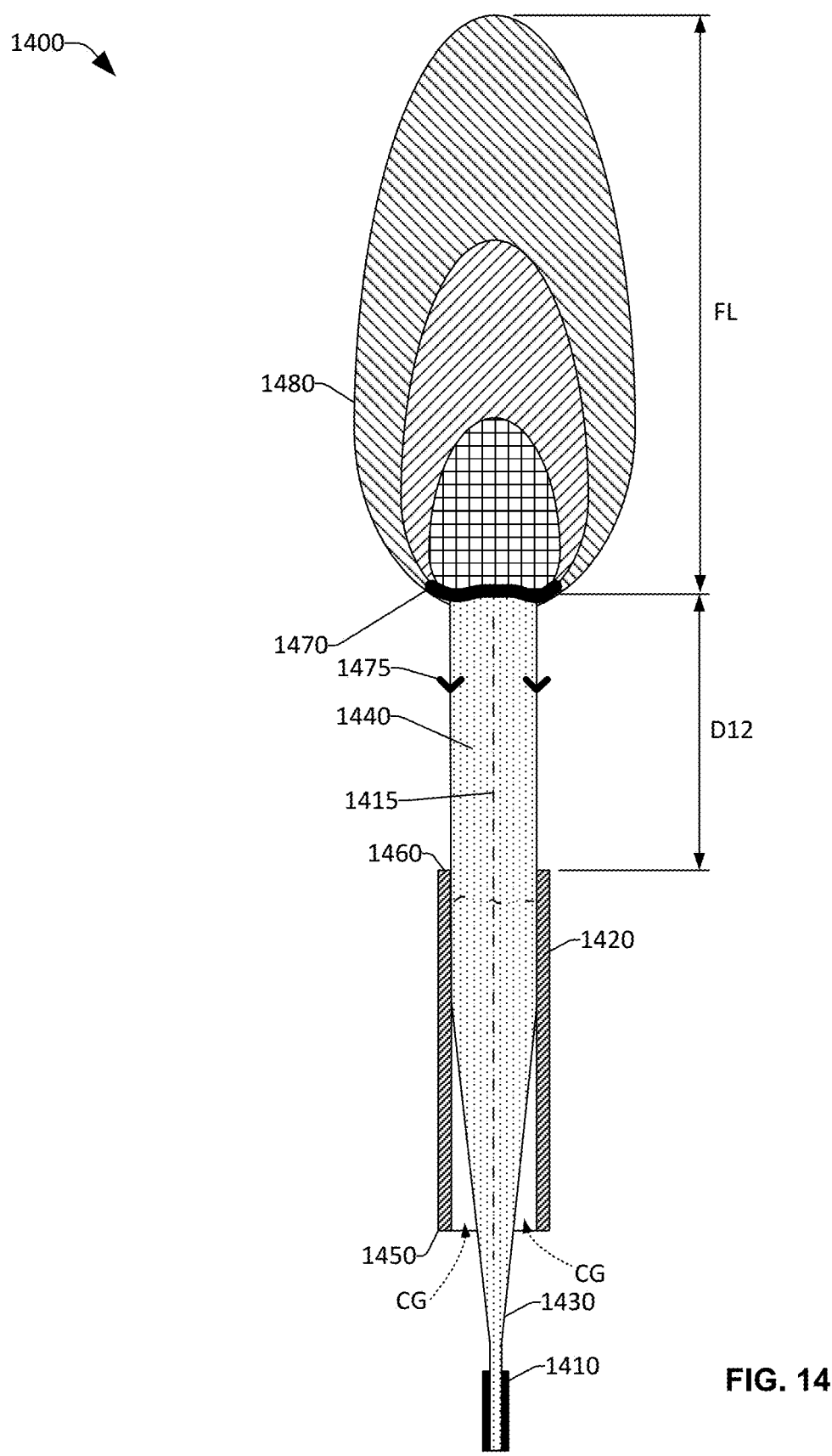
FIG. 14 is a schematic illustrating ignition of a fuel/charge-gas mixture in a ducted fuel configuration in an exemplary combustion chamber apparatus.

FIG. 14 presents a schematic 1400 of ignition of a fuel and charge-gas mixture. As shown in FIG. 14, a fuel injector 1410 is axially aligned along axis 1415 with a duct 1420, wherein, fuel 1430 is mixed with charge gas CG to form a fuel/charge-gas mixture 1440. A first end (proximate end) 1450 of the duct 1420 is located proximate to the fuel injector 1410, and a second end (distal end) 1460 of the duct 1420 is distally located from the fuel injector 1410. The fuel/charge-gas mixture 1440 is subsequently discharged from the distal end 1460 into a combustion chamber (per the various embodiments presented herein). The fuel/charge-gas mixture undergoes ignition at a location 1470 to form a flame 1480, wherein the position of location 1470 depends upon such factors as configuration of a combustion chamber in which the duct is located, fuel type, ignition technology being utilized (e.g., ignition based upon glow plug, spark plug, compression), etc., wherein the location 1470 is at a distance D12 from the distal end 1460 of the duct 1420. As previously described, placement of the duct 1420 around a jet of fuel 1430 can be utilized to enhance and optimize the degree of fuel/oxidizer mixing prior to ignition, yielding lower emissions, higher combustion efficiencies, and improved flame stability. In an aspect, the ignition of the fuel/charge-gas mixture 1440 may occur at a moment that is later than desired for operation of a particular engine in which the ducted fuel injection technology is being utilized. In an exemplary embodiment, delayed ignition can lead to a deleterious operational effect in the engine, e.g., increased noise compared with an engine that is not utilizing ducted fuel injection technology. A flame holder 1475 can be utilized as part of the system presented in FIG. 14.

As previously described, the various embodiments presented herein can be utilized for CI reciprocating engines, wherein a duct(s) (e.g., duct 150, 1420) can be positioned/aligned such that a fuel to charge-gas mixture having an equivalence ratio of <2 is achieved at ignition, to prevent soot formation. Further, for a duct configuration having a fuel/charge-gas mixture ratio of <1, emissions of nitrogen oxides ($NO_x$) may also be lowered, and to the extent that the duct (e.g., duct 150, 1420) prevents over-mixing from occurring on the sides of the jet of fuel (e.g., jet of fuel 185, 1430), HC and CO emissions may be lowered as well. The lower soot, HC, and CO emissions correspond to higher combustion efficiencies. As described (e.g., per FIG. 2), one or more fuel ducts can be arranged within the combustion chamber to enhance CI engine performance and reduce the need for expensive exhaust-gas aftertreatment systems. The various embodiments can be applied to all size classes of CI engines fueled by, for example, liquid fuel(s), gaseous fuel(s), or both.

For an SI reciprocating engine, in an exemplary configuration, a duct (e.g., duct 150, 1420) can be positioned such that a directly injected jet of fuel (e.g., jet of fuel 185, 1430) initially passes through the duct, and subsequently over a fuel ignitor downstream, such that the igniting fuel/charge-gas mixture has an equivalence ratio of <2, to prevent soot formation. If the duct can be configured such that the igniting fuel/charge-gas mixture has an equivalence ratio of <1, $NO_x$ emissions also will be lowered, and to the extent that the duct prevents over-mixing from occurring on the sides of the jet, HC and CO emissions will be lowered as well. The lower soot, HC, and CO emissions correspond to higher combustion efficiencies, and passively or actively tailoring the duct configuration to produce a narrow range of optimal equivalence ratios at the ignitor can reduce combustion cyclic variability. One or more ducts can be arranged within the combustion chamber to enhance SI engine performance and reduce the need for expensive exhaust-gas aftertreatment systems. Such a configuration can be applied to all size classes of SI engines fueled by, for example, liquid fuel(s), gaseous fuel(s), or both.

For a GT reciprocating engine, in an exemplary configuration, a duct (e.g., duct 150, 1420) can be positioned such that a directly injected jet of fuel (e.g., jet of fuel 185, 1430) initially passes through the duct, and subsequently over an ignitor and/or flame-holder downstream (e.g., 1475), such that the igniting fuel/charge-gas mixture has an equivalence ratio of <1, to prevent soot formation, lower $NO_x$ emissions, and prevent the over-mixing that leads to HC and CO emissions. The lower soot, HC, and CO emissions correspond to higher combustion efficiencies, and passively or actively tailoring the duct configuration can be used to enhance flame stability. One or more ducts can be arranged within the combustor to enhance GT engine performance and reduce exhaust emissions. Such a configuration can be applied to all size classes of mobile and stationary GT engines fueled by, for example, liquid fuel(s), gaseous fuel(s), or both.

For a burner and/or boiler application, in an exemplary configuration, a duct (e.g., duct 150, 1420) can be positioned such that a directly injected jet of fuel (e.g., jet of fuel 185, 1430) initially passes through the duct, and subsequently over an ignitor and/or flame-holder downstream (e.g., 1475), such that the igniting fuel/air mixture has the desired equivalence ratio. Passively or actively tailoring the duct configuration can be used to enhance performance and flame stability. Fuel-rich mixtures within a narrow range of stoichiometry can be utilized to maximize radiative heat transfer without producing excessive soot emissions, whereas fuel-lean mixtures can be used to eliminate soot formation, lower $NO_x$ emissions, and to the extent that the duct prevents over-mixing from occurring on the sides of the jet of fuel, HC and CO emissions may be lowered as well. The lower soot, HC, and CO emissions correspond to higher combustion efficiencies. One or more ducts can be arranged within the burner system to enhance performance and/or reduce the need for expensive exhaust-gas after-treatment systems. Such a configuration can be applied to all size classes of industrial burners and boilers fueled by, for example, liquid fuel(s), gaseous fuel(s), or both.

A ducted ignition component can form part of a combustion device utilized in apparatus configured to burn flammable gases and other materials in a gas flare operation, e.g., a wellhead gas flare, a refinery gas flare. For a wellhead/refinery flaring application, in an exemplary configuration, a duct (e.g., duct 150, 1420) can be positioned such that a directly injected jet of flare gas (e.g., jet of fuel 185, 1430) initially passes through the duct, and subsequently over an ignitor and/or flame-holder downstream, such that the igniting fuel/air mixture has an equivalence ratio of <1, to prevent soot formation, lower $NO_x$ emissions, and prevent the over-mixing that leads to HC and CO emissions. Passively or actively tailoring the duct configuration can be utilized to enhance flame stability. Such a configuration can be applied to all sizes of flaring operations.

As described herein, ducted fuel injection (DFI) can be effective at enhancing the extent of fuel/charge-gas premixing prior to ignition in directly injected fuel jets. In an embodiment, a catalytic material can be applied to one or more surfaces (e.g., the inside surfaces) of a duct and/or another feature (e.g., a ring or rods) that may be attached to the duct and/or positioned upstream or downstream of the duct. The catalytic material can be configured to shorten the ignition delay of a partially premixed mixture formed within and downstream of the duct to reduce the magnitude of the heat released during an initial premixed autoignition event, thereby lowering the noise produced by the CI engine (or other combustion device) in which the duct is used. For some applications and/or operating conditions, the mixture near the end (e.g., at opening 158) of the duct may require ignition assistance for optimal combustion-system performance. This might occur, for example, if the autoignition delay is too long or if the cyclic variability is too large under the given conditions without ignition assist. Potential ignition-assist technologies that can be coupled with DFI to enhance performance include catalytic material, a hot surface (e.g., glow plug), a spark, plasma (thermal or non-equilibrium), laser ignition, etc.

In an embodiment, an ignition assist component can include material for catalytic ignition assist, wherein the catalytic ignition assist can be a straightforward implementation, particularly in situations with multiple ducts. The catalytic ignition assist can be a catalytic material facilitating a complete, passive solution, e.g., the catalytic ignition assist does not require modifications to the combustion system beyond the installation of the catalytic components themselves. Such unnecessary modifications could include electrical systems, cabling, and/or windows, and these are in addition to the ignition-assist devices themselves (e.g., glow plugs, spark plugs, plasma generators, or lasers). Components comprising catalytic material can be placed near the ends of multiple ducts, whereas application of multiple hot-surface, spark, plasma, or laser ignition-assist devices within a combustion system may be inherently complex and/or expensive.

Figure 15:
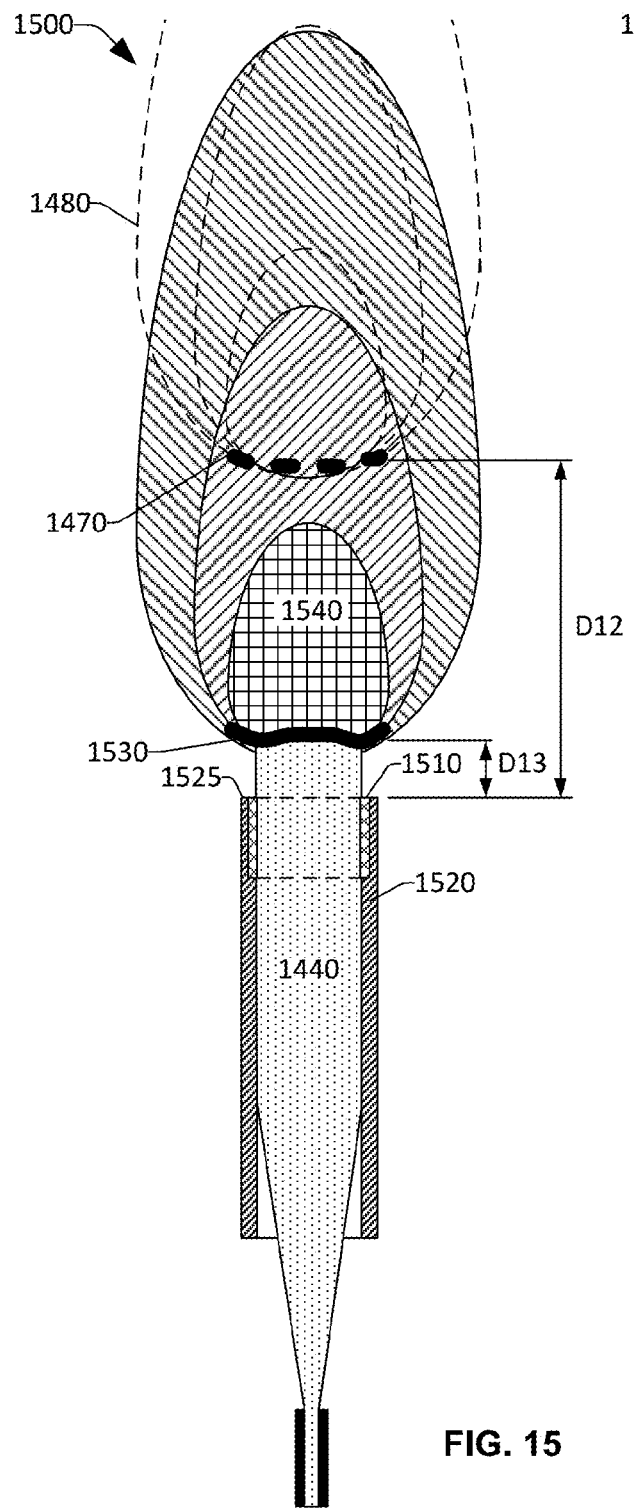
FIG. 15 is a schematic illustrating a fuel/charge-gas mixture being ignited by catalytic material located on a discharge end of a duct in an exemplary combustion chamber apparatus.

In an embodiment, a layer (coating) of catalytic material can be applied to one or more surfaces of a duct (e.g., the inner-diameter surface of the duct). FIG. 15, configuration 1500, illustrates an exemplary configuration, wherein a layer of catalytic material 1510 has been applied to a duct 1520 (e.g., similar to duct 1420). In an embodiment, the layer of catalytic material 1510 is applied to a downstream (distal) end 1525 of the duct 1520. The catalytic material 1510 can comprise any suitable material, e.g., a platinum-group metal, an ignition-promoting material, in pure form, or retained in a binder or other matrix. The catalytic material 1510 can be incorporated into the duct 1520 during manufacture, or it can be applied to the duct 1520 after manufacture, e.g., by plasma-spray deposition, as a washcoat, etc. The interaction of the fuel/charge-gas mixture 1440 with the catalytic material 1510 can function to shorten an ignition delay of the fuel/charge-gas mixture 1440 as a result of the catalytic material 1510 causing a chemical reaction(s) leading to ignition of the fuel/charge-gas mixture 1440 occurring earlier than in a system where no catalytic ignition assist was being utilized, e.g., as shown in FIG. 15, wherein ignition with the catalytic ignition assist occurs at region 1530 (a distance D13 from the distal end 1525 of the duct 1520) with a flame 1540 occurring thereafter, while ignition in a non-catalytic ignition assist system occurs (is delayed) at location 1470 (a distance D12 from the distal end 1525 of the duct 1520) with a flame 1480 occurring as indicated by the dashed lines. The catalytic coating 1510 can also help prevent carbonaceous deposits from forming on and/or within any coated parts, as the catalytic coating 1510 can assist in burning off such deposits.

Figure 16:
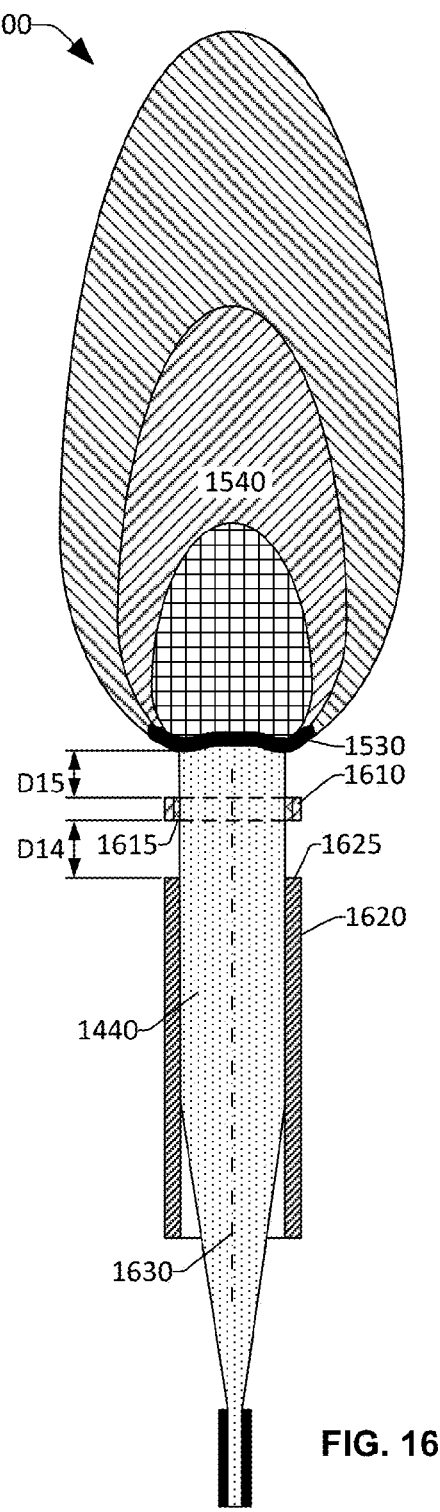
FIG. 16 is a schematic illustrating a fuel/charge-gas mixture being ignited by catalytic material located on an annulus in an exemplary combustion chamber apparatus.

FIG. 16, configuration 1600, illustrates another embodiment of utilizing a catalytic ignition-assist system wherein an annulus 1610 having a layer of catalytic material 1615 formed thereon is positioned such that its axis of radial symmetry is co-linear with the axis of a duct 1620, as depicted by the line 1630. In an embodiment, the layer of catalytic material 1615 can be located on an inner surface (e.g., inner concentric surface, surface of an inner ring forming the annulus 1610) such that as the fuel/charge-gas mixture 1440 passes through the inner ring, the catalytic material 1615 facilitates reactions within the fuel/charge-gas mixture 1440. As shown in FIG. 16, the annulus 1610 can be positioned at a distance D14 from a downstream end 1625 of the duct 1620, wherein, owing to the ignition being promoted by the catalytic material layer 1615 located on the annulus 1610, ignition of the fuel/charge-gas mixture 1440 occurs at region 1530 that is located closer to the duct 1620 than the position 1470 at which ignition of the non-catalytic ignition assist system occurs, as shown by the differences in distance D15 and D12, D15<D12. The annulus 1610 can be fabricated from a metallic-containing material such as steel, INCONEL, HASTELLOY, etc., a ceramic-containing material, etc.

Figure 17:
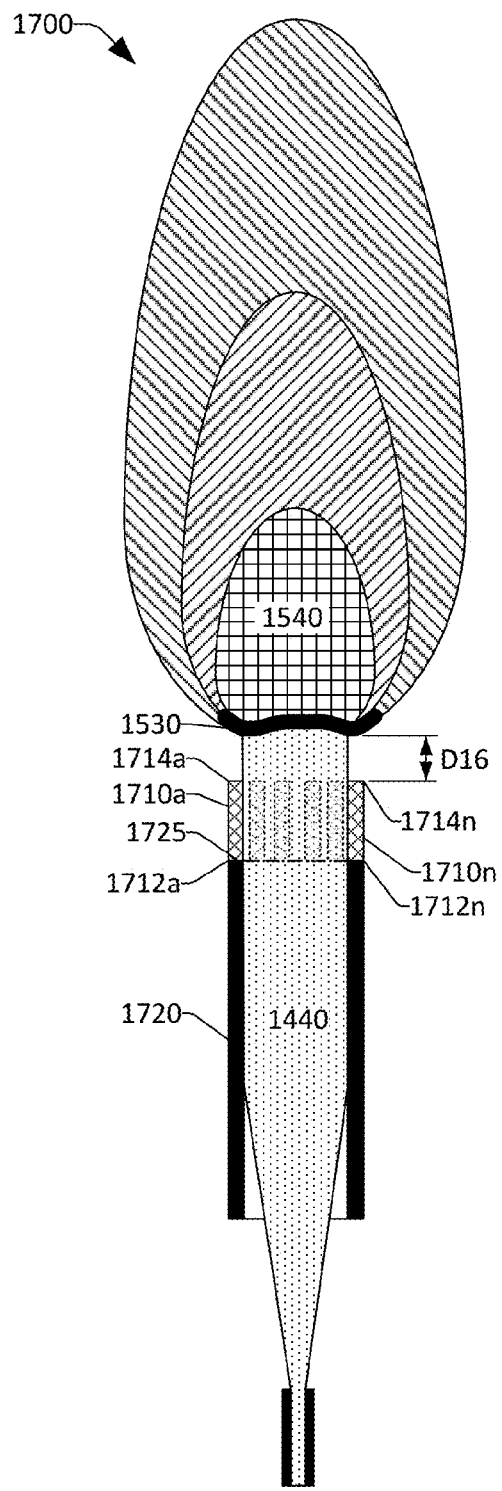
FIG. 17 is a schematic illustrating a fuel/charge-gas mixture being ignited by a plurality of rods covered with catalytic material in an exemplary combustion chamber apparatus.

FIG. 17, configuration 1700, illustrates a further embodiment of utilizing a catalytic ignition-assist system wherein one or more rods 1710*a-n*, having a layer of catalytic material formed thereon, are positioned on a duct 1720, e.g., the rods 1710*a-n* are located at (protruding from) the downstream end (distal end) 1725 of the duct 1720. The rods 1710*a-n* are respectively attached to the downstream end 1725 of the duct 1720 by a first, proximal end 1712*a-n*, and a second, distal end 1714*a-n* of each rod 1710*a-n* is distally located from the downstream end 1725 of the duct 1720. Interaction of the fuel/charge-gas mixture 1440 with the catalytic material of the rods 1710*a-n* causes ignition of the fuel/charge-gas mixture 1440. In a manner similar to the ignition depicted in FIGS. 15 and 16, the ignition region 1530 occurs at a distance D16 from the downstream end 1725 of the duct 1720, wherein the distance D16 is less than the distance D12 to the ignition region 1470 at which non-catalytic assisted ignition occurs.

Figure 18:
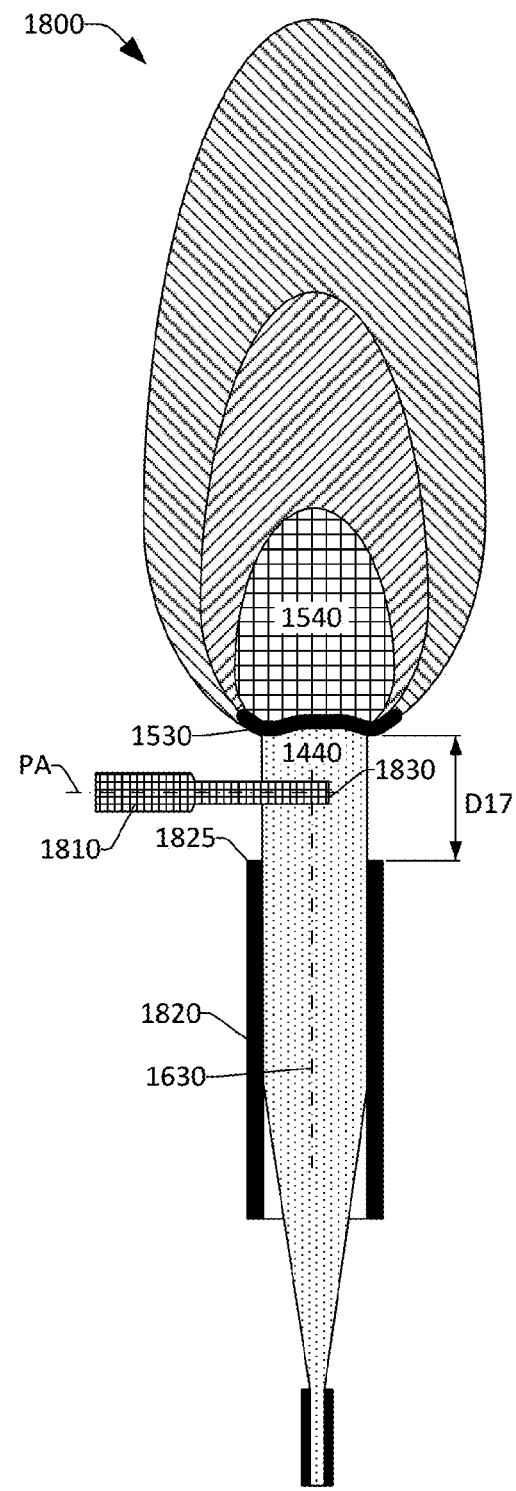
FIG. 18 is a schematic illustrating a glow plug igniting a fuel/charge-gas mixture in an exemplary combustion chamber apparatus.

Another form of ignition assist is hot-surface ignition assist. In an embodiment, one or more hot-surface ignition-assist devices (e.g., glow plugs) can be located in a combustion chamber (e.g., the combustion chamber 105) to promote ignition with DFI configurations, thereby shortening the ignition delay and/or reducing a degree of variation in combustion occurring in the cyclic operation of an engine, etc. FIG. 18 presents a configuration 1800, wherein a glow plug 1810 is located downstream of the duct 1820, e.g., at the downstream end 1825 of the duct 1820. As shown, a heated tip 1830 of the glow plug 1810 is located in the flow path of the fuel/charge-gas mixture 1440, such that a primary axis PA of the glow plug 1810 intersects the axis 1630 of the duct 1820, with the hot glow plug end 1830 functioning as a bluff body to stabilize the flame 1540. In a manner similar to the ignition depicted in FIGS. 15-17, the ignition region 1530 occurs at a distance D17 from the downstream end 1825 of the duct 1820, wherein the distance D17 is less than the distance D12 to the ignition region 1470 at which non-catalytic assisted ignition occurs. The glow plug 1810 and associated control electronics can be of any type utilized in production CI engines to assist with engine cold-starting, or can further incorporate design enhancements to improve performance of the glow plug in DFI applications.

In another embodiment, one or more spark plugs can be installed within the combustion system to promote ignition in a DFI configuration (e.g., spark ignition assist). In this embodiment, a spark plug can be positioned in a manner similar to the glow plug 1810, wherein the spark-plug gap of the spark plug is positioned relative to the duct exit in the downstream flow of the premixed gases emanating from the duct, such that the premixed gases pass through the spark gap and can be ignited by one or more properly timed spark discharges occurring at the spark gap. The spark-plug gap can be located at a similar position as the heated tip 1830 of the glow plug 1810 shown in FIG. 18, thereby facilitating ignition of the fuel/charge-gas mixture 1440 at the distance D17 from the downstream end 1825 of the duct 1820, where D17<D12. The spark plug and associated control electronics can be of any type utilized in production SI engines, or can further incorporate design enhancements to improve performance of the spark plug in DFI applications.

In a further embodiment, one or more plasma torches can be installed within the combustion system to promote ignition in a DFI configuration (e.g., plasma ignition assist), wherein a first end of a plasma torch emits a plasma jet. In this embodiment, a plasma torch can be positioned in a manner similar to the glow plug 1810, wherein the first end of the plasma torch is positioned relative to the downstream end 1825 of the duct 1820 in the downstream flow of the fuel/charge-gas mixture 1440, such that the fuel/charge-gas mixture 1440 passes through the plasma jet and is ignited by one or more properly timed plasma jet emissions. The first end of the plasma torch can be located at the same position as the heated tip 1830 of the glow plug 1810, thereby facilitating ignition of the fuel/charge-gas mixture 1440 at the distance D17 from the downstream end 1825 of the duct 1820. The plasma jet can be of any suitable technology, e.g., thermal or non-equilibrium.

Figure 19:
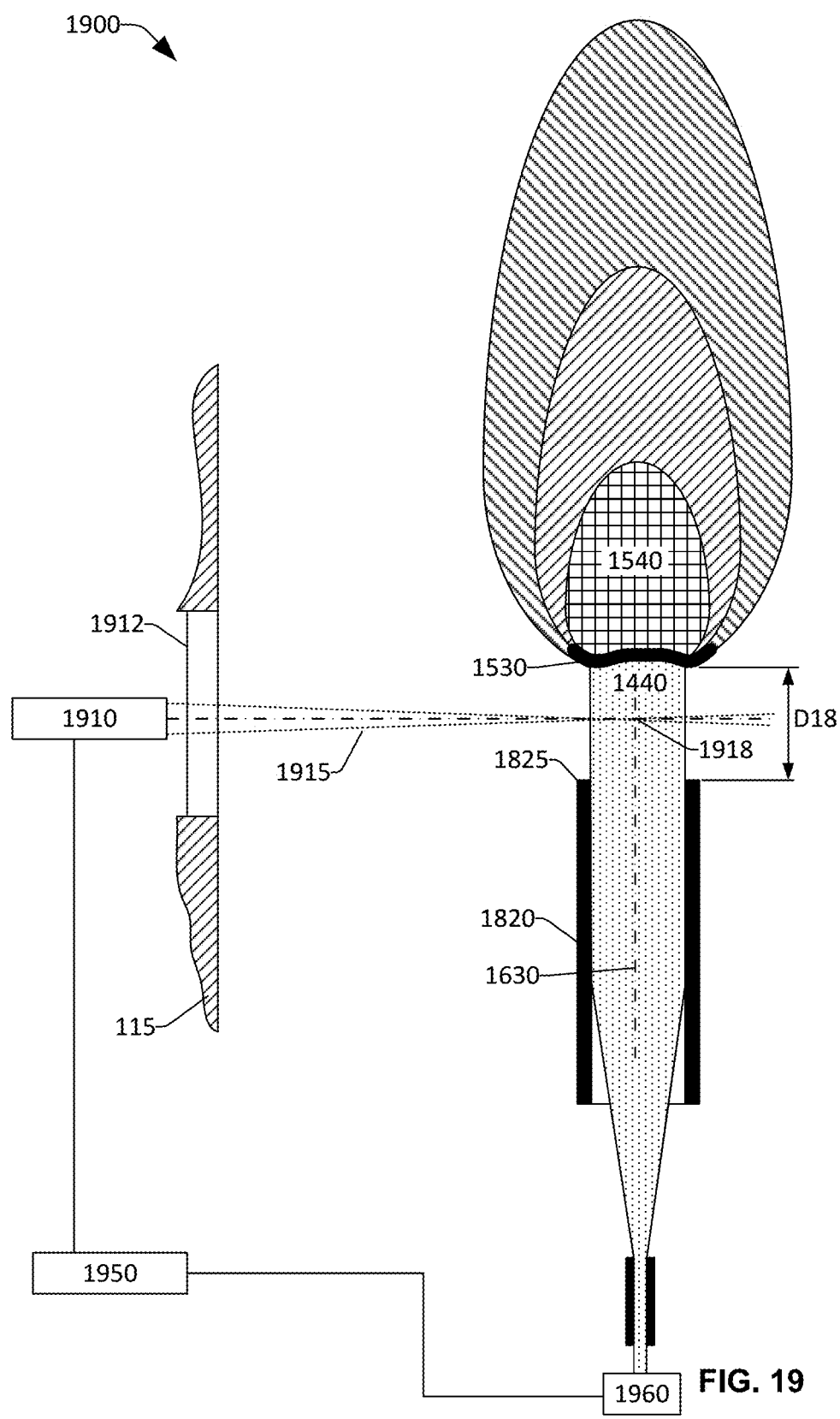
FIG. 19 is a schematic illustrating a laser beam igniting a fuel/charge-gas mixture in an exemplary combustion chamber apparatus.

In a further embodiment, a focused laser beam can be installed in the combustion system to promote ignition in a DFI configuration (e.g., laser ignition assist). FIG. 19 illustrates a configuration 1900 utilizing a focused laser beam to ignite a fuel/charge-gas mixture. A laser 1910 can be located behind a window 1912, wherein the window 1912 is located in the sidewall 115 or cylinder head 125 of a combustion chamber. The laser 1910 can be configured to emit a focused pulsed laser beam 1915 (e.g., a converging laser beam) of sufficient energy to produce a spark at a focal point 1918 of the laser (aka, the waist), creating ions and radicals that can promote ignition of the fuel/charge-gas mixture 1440. As shown in FIG. 19, the pulsed laser beam 1915 would produce a spark at its waist 1918 positioned near the axis 1630 of the duct 1820 and slightly downstream of the downstream end 1825 of the duct 1820. The laser pulse(s) 1915 would be timed relative to the fuel-injection event such that ignition would be promoted. The focal point 1918 of the laser beam 1915 can be configured to occur at a similar position as the heated tip 1830 of the glow plug 1810, thereby facilitating ignition of the fuel/charge-gas mixture 1440 at the distance D18 from the downstream end 1825 of the duct 1820. The laser beam 1915 can be of any suitable technology, e.g., a laser diode, a neodymium-doped yttrium aluminum garnet (Nd:YAG) laser. A timing control component 1950 can be utilized to control operation of a fuel injector driver 1960, and can further be configured to control operation of the laser 1910 such that the pulsed laser beam 1915 can be controlled for synchronous operation with the fuel injector driver 1960 to facilitate ignition of the fuel/charge-gas mixture 1440 as desired, e.g., ignition occurs at the location 1530. It is to be appreciated that while not shown in FIG. 18, a timing component can be utilized to control fuel flow and operation of an ignition assist component to facilitate ignition of the respective fuel/charge-gas mixtures at the desired location with the respective ignition assist component (e.g., the glow plug 1810, the spark plug, etc.).

The respective location of the layer of catalytic material 1510/downstream end 1525 of the duct 1520, an annulus 1610 and catalytic material located thereon, respective distal ends 1714a-n of rods 1710a-n, the heated tip 1830 of the glow plug 1810, the focal point of the laser beam 1918, etc., e.g., positions D13, D14, D15, D16, D17, and D18 can be configured to facilitate the desired location of the respective ignition region 1530. These distances will typically fall in the range from one tenth to five times the diameter D2 of the duct 150 at its downstream end 158.

FIG. 20 illustrates a methodology 2000 for igniting a fuel/charge-gas mixture after the fuel/charge-gas mixture has been emitted from a duct located in a combustion chamber. At 2010, an ignition assist component is located with respect to a discharge end of a duct, wherein the duct is located and aligned proximate to a fuel jet opening. As previously described, fuel is directed through the fuel jet opening, and mixes with charge gas in the duct, whereupon the fuel/charge-gas mixture is emitted from a discharge end of the duct. The ignition assist component can comprise any suitable device, material, etc., to facilitate ignition of the fuel/charge-gas mixture being emitted from the discharge end of the duct, such as a glow plug, a spark plug, a laser equipped with optics to create a focused laser beam, etc. Further, a component either formed from a catalytic material, or having a layer of catalytic material located thereon, can be positioned with respect to the emission of the fuel/charge-gas mixture from the duct, wherein reaction of the fuel/charge-gas mixture facilitated by the catalytic material promotes ignition of the fuel/charge-gas mixture. The component can be separate from the duct (e.g., an annulus that includes the catalytic material) or a layer of the catalytic material can be applied to the duct.

At 2020, operation of the ignition assist component can be controlled to facilitate ignition of the fuel/charge-gas mixture as the fuel/charge-gas mixture is emitted from the discharge end of the duct. For example, where the ignition assist component is a laser equipped with optics to create a focused laser beam, the laser can be controlled such that it operates as a pulsed laser, emitting bursts of energy in accordance with a timing regimen at which the fuel/charge-gas mixture is emitted from the duct. In another embodiment, where the ignition assist component is a plasma torch, the operation can be controlled such that the plasma torch sequentially emits bursts of plasma synchronized with the timing of the fuel/charge-gas mixture being emitted from the duct. In a further embodiment, where the ignition assist component is a glow plug, the glow plug can be controlled such that the glow plug is continuously hot and ignites the fuel/charge-gas mixture as it is emitted from the duct. In a further embodiment, the ignition assist component can be formed from a catalytic material that facilitates reactions within the fuel/charge-gas mixture to promote the ignition thereof. As previously mentioned, the catalytic material can be incorporated into the duct (e.g., as a layer of material, or attached thereto by rods), or the catalytic material can be located on a component that is separately located to the duct, e.g., an annulus wherein the fuel/charge-gas mixture discharges from the duct and passes through the central hole in the annulus, and the central hole has catalytic material located therein.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A combustion system, comprising:
   a fuel injector comprising a plurality of openings, wherein a fuel is injected through the openings into a combustion chamber of an engine; and
   a plurality of ducts located in the combustion chamber, each duct formed from a hollow tube, wherein each duct is aligned with a respective opening in the openings such that the fuel exiting the openings of the fuel injector is injected through the hollow tubes and into the combustion chamber, wherein passage of the fuel through the hollow tubes causes charge-gas present in the combustion chamber to be drawn into the hollow tubes thereby mixing the injected fuel with the charge-gas.

2. The combustion system of claim 1, wherein the combustion system is a compression-ignition reciprocating engine.

3. The combustion system of claim 1, wherein the combustion system is a spark-ignition reciprocating engine.

4. The combustion system of claim 1, wherein the combustion system is a gas-turbine engine.

5. The combustion system of claim 1, wherein the combustion system is included in a burner apparatus.

6. The combustion system of claim 1, wherein the combustion system is included in a boiler apparatus.

7. The combustion system of claim 1, wherein the combustion system is included in an apparatus configured to burn flammable gas in a gas flare operation.

8. A method for mixing a fuel with a charge-gas in a combustion chamber, comprising:
   injecting fuel through a plurality of openings in a fuel injector, the openings located in the combustion chamber; and
   mixing the injected fuel with the charge-gas in a plurality of ducts located within the combustion chamber, wherein each of the ducts comprises a hollow tube and is aligned with a respective opening in the openings such that the injected fuel travels through the hollow tubes and into the combustion chamber, the passage of the fuel through the hollow tubes causing turbulent flow of the fuel within the hollow tube and thereby causing charge-gas present in the combustion chamber to be drawn into the hollow tubes and mixing the injected fuel with the charge-gas.

9. The method of claim 8, wherein the combustion chamber forms part of a compression-ignition reciprocating engine.

10. The method of claim 8, wherein the combustion chamber forms part of a spark-ignition reciprocating engine.

11. The method of claim 8, wherein the combustion chamber forms part of a gas-turbine engine.

12. The method of claim 8, wherein the combustion chamber is included in a burner apparatus.

13. The method of claim 8, wherein the combustion chamber is included in a boiler apparatus.

14. The method of claim 8, wherein the combustion chamber is included in an apparatus configured to burn flammable gas in a gas flare operation.

15. A fuel injection system, comprising:
   a fuel injector comprising a first opening and a second opening, wherein a first jet of fuel is injected through the first opening into a combustion chamber, and a second jet of fuel is injected through the second opening into the combustion chamber;
   a first duct positioned in the combustion chamber and formed from a first hollow tube, wherein the first duct is aligned such that the first jet of fuel exiting the first opening is injected through the first hollow tube and into the combustion chamber such that the passage of the fuel through the first hollow tube causes charge-gas present in the combustion chamber to be drawn in the first hollow tube thereby mixing the injected fuel with the charge-gas; and
   a second duct positioned in the combustion chamber and formed from a second hollow tube, wherein the second duct is aligned such that the second jet of fuel exiting the second opening is injected through the second hollow tube and into the combustion chamber such that the passage of the fuel through the second hollow tube causes charge-gas present in the combustion chamber to be drawn in the second hollow tube thereby mixing the injected fuel with the charge-gas.

16. The fuel injection system of claim 15, wherein the fuel injection system is located in a compression-ignition reciprocating engine.

17. The fuel injection system of claim 15, wherein the fuel injection system is located in a spark-ignition reciprocating engine.

18. The fuel injection system of claim 15, wherein the fuel injection system is located in a gas-turbine engine.

19. The fuel injection system of claim 15, wherein the fuel injection system is included in a burner apparatus.

20. The fuel injection system of claim 15, wherein the fuel injection system is included in an apparatus configured to burn flammable gas in a gas flare operation.

* * * * *